US010527016B2

(12) United States Patent
Hagmann et al.

(10) Patent No.: US 10,527,016 B2
(45) Date of Patent: Jan. 7, 2020

(54) PLUG CONNECTOR AND MOTOR OR VALVE COVER ELEMENT COMPRISING A PLUG CONNECTOR

(71) Applicant: ITT MANUFACTURING ENTERPRISES, LLC, Wilmington, DE (US)

(72) Inventors: Bernd Hagmann, Bad Ueberkingen (DE); Martin Littek, Kernen (DE); Friedrich Karl Albrecht, Schorndorf (DE); Andreas Zimmermann, Kernen (DE)

(73) Assignee: ITT MANUFACTURING ENTERPRISES, LLC, Wilmington, DE (US)

(*) Notice: Subject to any disclaimer, the term of this patent is extended or adjusted under 35 U.S.C. 154(b) by 48 days.

(21) Appl. No.: 15/774,973

(22) PCT Filed: Nov. 9, 2016

(86) PCT No.: PCT/IB2016/001665
§ 371 (c)(1),
(2) Date: May 9, 2018

(87) PCT Pub. No.: WO2017/081537
PCT Pub. Date: May 18, 2017

(65) Prior Publication Data
US 2018/0372041 A1    Dec. 27, 2018

(30) Foreign Application Priority Data
Nov. 11, 2015    (DE) .................. 10 2015 222 190

(51) Int. Cl.
*H01R 13/44*    (2006.01)
*F02M 51/00*    (2006.01)
(Continued)

(52) U.S. Cl.
CPC ......... *F02M 51/005* (2013.01); *H01R 13/207* (2013.01); *H01R 13/5202* (2013.01);
(Continued)

(58) Field of Classification Search
CPC . F02M 51/005; H01R 13/207; H01R 13/5202
See application file for complete search history.

(56) References Cited

U.S. PATENT DOCUMENTS 4,225,206 A  *  9/1980  Roman, Jr. ........ H01R 13/6273
                                                                439/274
4,346,847 A  *  8/1982  Rissi .................. F02M 51/0685
                                                                239/585.2
(Continued)

FOREIGN PATENT DOCUMENTS

DE     10 2012 206486 A1    10/2013
DE     10 2013 019 826 A1    5/2015
FR     2 592 994 A1    7/1987

OTHER PUBLICATIONS

Examination Report received in German Application No. 10 2015 222 190.3 dated Nov. 10, 2016 in 4 pages.
(Continued)

*Primary Examiner* — Amy Cohen Johnson
*Assistant Examiner* — Milagros Jeancharles
(74) *Attorney, Agent, or Firm* — Knobbe, Martens, Olson & Bear, LLP

(57) ABSTRACT

A plug connector for connecting to an electric connection of a fuel injector of an internal combustion engine can comprise a rail extending in a longitudinal direction and at least one insulating element arranged in a linearly movable manner in the longitudinal direction relative to the rail, wherein the at least one insulating element protrudes out of the rail in a transverse direction. In some embodiments, the at least one insulating element comprises means for electrically connecting to the electric connection of the fuel injector in
(Continued)

an oil-tight and releasable manner on a side facing away from the rail in the transverse direction. In some embodiments, the rail comprises a guide extending in the longitudinal direction configured to guide the at least one insulating element relative to the rail in the longitudinal direction and hold the same in a formfitting manner in the transverse direction relative to the rail.

20 Claims, 18 Drawing Sheets

(51) Int. Cl.
  *H01R 13/207* (2006.01)
  *H01R 13/52* (2006.01)
  *H01R 25/00* (2006.01)
  *H01R 31/06* (2006.01)
  *H02G 3/04* (2006.01)
(52) U.S. Cl.
  CPC .......... *H01R 25/003* (2013.01); *H01R 31/06* (2013.01); *H02G 3/0437* (2013.01); *H02G 3/0468* (2013.01)

(56) References Cited

U.S. PATENT DOCUMENTS

| | | | | |
|---|---|---|---|---|
| 4,950,171 | A * | 8/1990 | Muzslay | F02M 51/005 123/456 |
| 5,016,594 | A * | 5/1991 | Hafner | F02M 51/005 123/456 |
| 5,070,844 | A * | 12/1991 | Daly | F02M 51/005 123/456 |
| 5,127,382 | A * | 7/1992 | Imoehl | F02M 51/005 123/456 |
| 5,129,834 | A * | 7/1992 | Cranford | F02M 51/005 123/456 |
| 5,168,857 | A * | 12/1992 | Hickey | B29C 45/14639 123/456 |
| 5,178,115 | A * | 1/1993 | Daly | F02D 41/3005 123/456 |
| 5,189,782 | A * | 3/1993 | Hickey | F02D 41/3005 123/456 |
| 5,197,675 | A * | 3/1993 | Daly | F02D 41/3005 123/472 |
| 5,562,477 | A | 10/1996 | Moore et al. | |
| 5,584,704 | A * | 12/1996 | Romann | F02M 51/005 439/130 |
| 5,598,824 | A * | 2/1997 | Treusch | F02M 51/005 123/456 |
| 5,616,037 | A * | 4/1997 | Lorraine | F02M 51/005 123/456 |
| 6,139,345 | A * | 10/2000 | Muzslay | H01R 13/6608 439/189 |
| 7,094,077 | B1 * | 8/2006 | Chen | H01R 25/142 439/118 |
| 2003/0164157 | A1 * | 9/2003 | Bodenhausen | F02M 51/005 123/470 |
| 2007/0084443 | A1 * | 4/2007 | Nonoyama | F02M 51/005 123/458 |
| 2008/0090432 | A1 * | 4/2008 | Patterson | H01R 25/142 439/121 |
| 2009/0156063 | A1 * | 6/2009 | Desaint | F02M 51/005 439/688 |
| 2011/0006130 | A1 * | 1/2011 | Kondo | F02M 47/027 239/71 |
| 2013/0074805 | A1 * | 3/2013 | Yamamoto | F02M 51/06 123/456 |
| 2015/0338584 | A1 * | 11/2015 | Islam | G02B 6/3849 385/86 |

OTHER PUBLICATIONS

International Search Report and Written Opinion for International Application No. PCT/IB2016/001665 dated May 18, 2017 in 6 pages.

* cited by examiner

PLUG CONNECTOR AND MOTOR OR VALVE COVER ELEMENT COMPRISING A PLUG CONNECTOR

CROSS REFERENCE

This application is a U.S. National Phase of PCT International Application No. PCT/IB2016/001665, filed Nov. 9, 2016 and published as WO 2017/081537 on May 18, 2017, which claims priority to German Application No. 102015222190.3, filed Nov. 11, 2015. The entire disclosure of each of the above-identified applications is hereby incorporated by reference.

BACKGROUND

Field

The present disclosure relates to a plug connector and a motor or valve cover element comprising at least one such plug connector.

Certain Related Art

Injectors for injecting fuel are installed in internal combustion engines, e.g., combustion engines of motor vehicles, so as to be covered by a motor or valve cover element. Particularly in commercial vehicles, the injectors respectively comprise two contacts which are designed as threaded pins and to which oil-tight cables are connected. These cables are generally guided out of the motor or valve cover element using an electric connector. In order to seal the motor or valve cover element in a pressure-tight and oil-tight manner, pressure-tight and oil-tight cable feedthroughs are provided, which are arranged on a frame that can be mounted on the motor housing in a pressure-tight and oil-tight manner. The frame serves to fix the required cables and to feed the cables through in an oil-tight manner.

Each injector must respectively be connected to two of the oil-tight cables. The electrical connection must, on the one hand, be oil-tight. On the other hand, the connection must not be loosened in case of vibration. Damage to the cable feedthrough, the cables, or the connection as a result of vibration must be avoided.

In order to fulfill these requirements, the cables are generally mounted individually on the contacts of the injectors using suitable screw connections.

The effort required for mounting the screw connections is great. The use of oil-tight cables results in costs that are significantly higher compared to non-oil-tight cables.

SUMMARY OF CERTAIN FEATURES

An aim of the present disclosure is therefore to create a plug connector of the aforementioned type which is easily mounted and constitutes a safe alternative for contacting the injectors using the cables and their screw connections, without using oil-tight cables or oil-tight cable feedthroughs.

In certain embodiments, in order to achieve this aim, the features specified in claim 1 are provided in a plug connector of the type mentioned.

A motor or valve cover element for an internal combustion engine, comprising such a plug connector is also provided.

The measures according to the disclosure achieve a plug connector and a motor or valve cover element that can be easily mounted and does not require any oil-tight cables between the motor and the motor or valve cover element.

Advantageously, at least one holding element, which is held by a guide in a force-fitted manner movably in the longitudinal direction, is arranged adjacently in the longitudinal direction to at least one insulating element on a rail which extends in the longitudinal direction. This allows for a pre-positioning, suitable for the arrangement of the injectors on the motor, of the plug connectors on the rail. For mounting, the insulating elements can thus be moved through respective openings in the motor or valve cover element.

Advantageously, between the rail and the at least one insulating element or between the rail and the at least one holding element, at least one spacer element is arranged which extends in a transverse direction, i.e., transversely to the longitudinal direction of the rail, wherein the spacer element is designed as a cable guide which extends in the longitudinal direction between the rail and the at least one insulating element or between the rail and the at least one holding element. In this way, the cable guide is integrated into the plug connector.

It is particularly advantageous if the at least one spacer element is arranged on the at least one insulating element or the at least one holding element on its side facing the rail. As a result, the cable guide can be mounted on the rail in one work step together with the insulating element or the holding element.

It is particularly advantageous if the at least one spacer element and the at least one insulating element or the at least one spacer element and the at least one holding element are designed to be integral. In this way, the cable guide can be produced in sections in one work step together with the insulating element or the holding element.

The cables are thus arranged in the intermediate space between the rail and the insulating element or the holding element. There, the cables are protected from mechanical stress, oil, or other contamination.

It is particularly advantageous if, on one end of the rail, in the longitudinal direction, a cable feedthrough is arranged through which cables are guided into the plug connector, wherein outside the rail is arranged a cable guide which is preferably tube-like or flexible and which is preferably formed via an adapter with the cable feedthrough arranged on the rail. This facilitates mounting and an organized cable guidance up to the connection points of the insulating element(s).

Advantageously, the at least one insulating element comprises, in a region guided by the rail, a preferably barrel-shaped bulge which is radial with respect to the transverse direction, wherein the bulge interacts with an opposite inner edge of the guide in order to allow for the rotation in a direction of rotation about the axis in the transverse direction and in order to limit the rotation to a predefined maximum angle of rotation in the direction of rotation. This allows compensating for tolerances arising in the direction of rotation in the position of the electric connections of the injectors relatively to the corresponding connections of the plug connector.

Advantageously, the at least one holding element comprises, in a region guided by the rail, a preferably barrel-shaped bulge in the transverse direction, wherein the bulge interacts with an opposite inner edge of the guide in order to produce, in the transverse direction, a predefined pre-loading that clamps the holding element into the guide. This allows for a particularly easy production of holding elements that can be connected to the guide in a force-fitted manner.

Advantageously, the guide is a trapezoidal guide, a dovetail guide, or a guide with tongue and groove. This particularly easily allows for the production of the rail by milling or in an extrusion process.

Advantageously, the inner dimensions of the guide and the outer dimensions of the at least one insulating element are selected such that the at least one insulating element can be moved a predefined distance orthogonally to the longitudinal direction and orthogonally to the transverse direction. This allows compensating for tolerances arising in the respective directions in the position of the electric connections of the injectors relatively to the corresponding connections of the plug connector.

It is particularly advantageous if the rail consists of aluminum—preferably, of a profile extruded or milled in the longitudinal direction. This allows for a particularly easy production of the rail.

The at least one insulating element advantageously tapers conically in the transverse direction towards a free end. In this way, the insulating element acts as a centering means in the transverse direction.

It is particularly preferred if at least one electric pin or receptacle connector contact which extends in the transverse direction is mounted in a pressure-tight and/or oil-tight manner in the at least one insulating element.

It is particularly preferred if at least one cable feedthrough extends in the transverse direction in the at least one insulating element from a side, facing the rail, of the electric pin or receptacle connector contact to an outer surface, facing the rail, of the at least one insulating element. A contact with cables that are not oil-tight or pressure-sensitive is thus made possible on the oil-free and/or pressure-free side of the insulating element.

It is particularly preferred if the cable feedthrough comprises a seal—preferably, an elastic seal—with openings for cables to be fed through. The seal protects the contact point during assembly from the intrusion of foreign bodies or moisture. In the case of vibrations, the seal moreover acts as a support for the cables fed through it.

It is particularly preferred if a seal, which radially extends around the insulating element protruding out of the rail in the transverse direction, is preferably made of silicone, and is preferably designed for sealing between the insulating element and a corresponding feedthrough of a motor or valve cover in a pressure-tight and oil-tight manner, is arranged on at least one insulating element on a side, facing away from the rail, of the insulating element. The motor or valve cover is thereby sealed particularly easily by means of the plug connector.

It is particularly preferred if a receptacle or pin connector contact extending in the transverse direction away from the free end of the at least one insulating element is arranged on said insulating element at its free end.

A blind hole open toward the outside is preferably arranged in the sheath of the receptacle connector contact. The receptacle allows for enclosing the respective electric connection from the outside, wherein the blind hole serves as an oil drain. This prevents any oil that enters the receptacle from the space enclosed by the motor or valve cover from remaining inside the receptacle and thus influencing the electric connection.

It is particularly preferred if the receptacle or pin connector contact can be connected in a releasable, force-fitted, pluggable manner to the pin or receptacle connector contact at the free end of the insulating element, and if a female machine thread—preferably, an M3, M4, or M5 female thread—is arranged in the receptacle or pin connector contact on the side facing away from the free end of the insulating element. In this way, the receptacle serves as an adapter for injectors with a corresponding machine thread. This receptacle is pre-installed onto the injector. Then, the plug connector can be plugged in.

It is particularly preferred if the at least one insulating element or the at least one holding element is guided at two of its outer edges by the guide, wherein the outer edges extend in the longitudinal direction on opposite outer surfaces of a base plate of the at least one insulating element or of the at least one holding element. In this way, the insulating element or the holding element is guided particularly well.

It is particularly preferred if a wiring harness for connecting the plug connector—preferably, two twisted cables—is arranged in the longitudinal direction between the rail and the at least one insulating element from a free end of the rail arranged in the longitudinal direction to the at least one insulating element. The arrangement of the cables is thus particularly space-saving.

It is particularly preferred if several insulating elements—preferably 3, 4, 5, 6, 7, or 8—are arranged on the rail in the longitudinal direction. Such rails can be prefabricated according to the number of injectors to be connected and can be used during assembly for connecting all injectors of a motor at the same time.

It is particularly preferred if several holding elements—preferably, alternatingly with insulating elements—are arranged on the rail in the longitudinal direction. In this way, the individual distance between the injectors can be pre-positioned as distance between the insulating elements on the rail.

It is particularly preferred if a movable finger is provided, wherein the at least one holding element or the at least one insulating element preferably comprises the movable—preferably, resilient—finger on an outer contact surface facing the at least one insulating element or the at least one holding element, the finger extending in parallel to the contact surface between the at least one insulating element and the at least one holding element. In the arrangement described, the resilient fingers in contact with a directly adjacent insulating element act as path-adjusting element. The spring force applied makes possible the rotation of the insulating element until the finger abuts against the outer contact surface in the rail. When using several units, all resilient fingers—hereinafter also referred to as spring arms—generate a pre-loading in the system and allow for a sufficiently good pre-positioning of the free ends of the insulating elements as a result of the equilibrium of forces. The spring arms are preferably designed to be integral with the at least one holding element or the at least one insulating element. The spring arms can also be designed as a separate component, arranged between the respective holding elements and insulating elements in a manner guided in the rail. The spring arms can consist of metal or plastic.

Other details of the disclosure can be taken from the following description, in which the disclosure is described and explained in more detail with reference to the exemplary embodiments shown in the drawings.

DETAILED DESCRIPTION OF CERTAIN EMBODIMENTS

Figure 1:
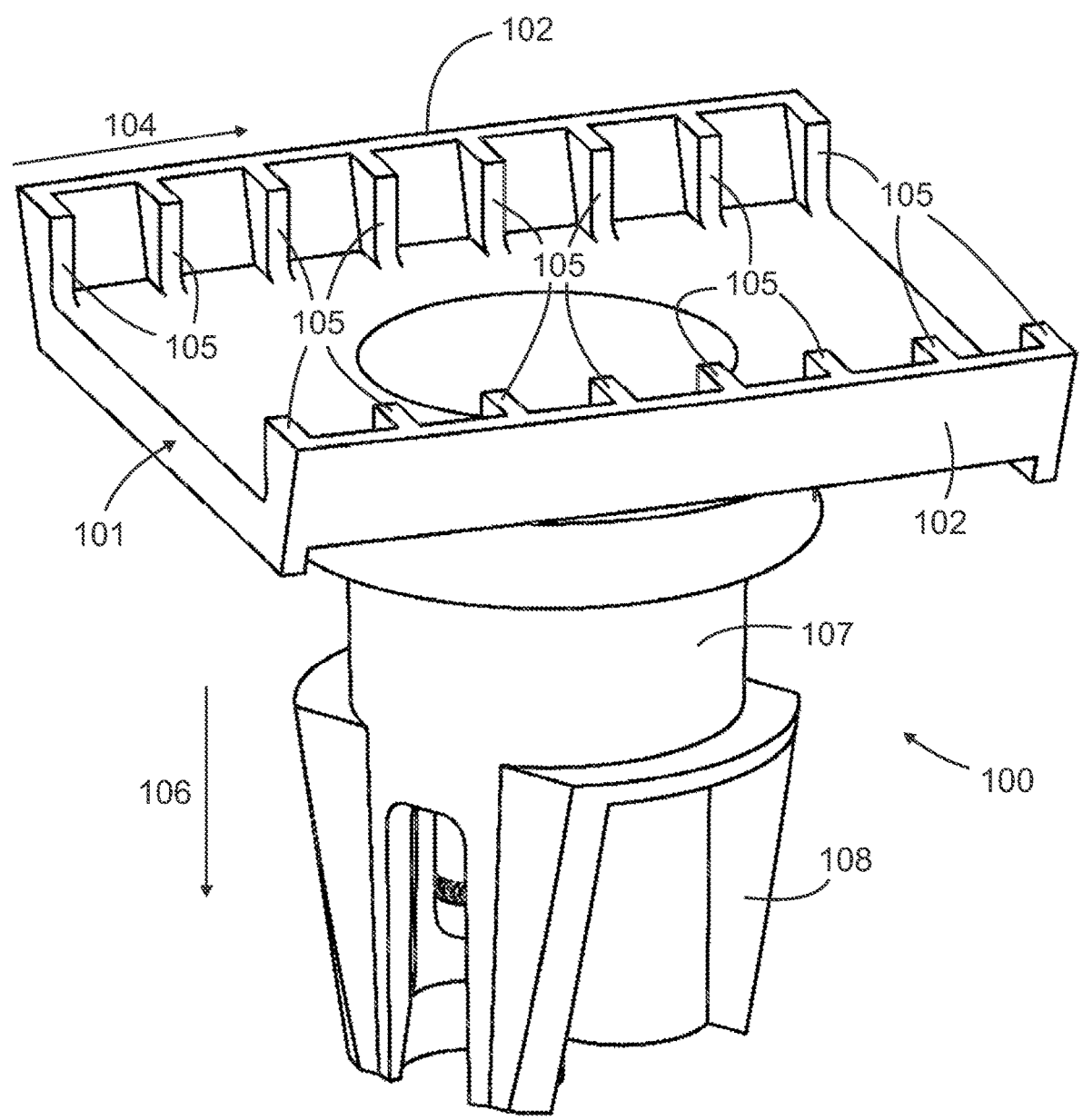
FIG. 1 illustrates a first perspective view of an insulating element.

A plug connector is described below with reference to the embodiments shown in the drawings. Components with the same function are denoted by the same reference symbols in the drawings.

FIG. 1 shows a first perspective view of an insulating element 100 of a plug connector for connecting to an electric connection of a fuel injector.

The insulating element 100 comprises a base plate 101 with two longitudinal outer edges 102 extending on opposite sides of the base plate 101 in a longitudinal direction illustrated by an arrow 104.

On the insulating element 100 is arranged a spacer element 105, which extends from the base plate 101 in a transverse direction, illustrated by an arrow 106, away from the base plate 101. In the example of FIG. 1, the spacer element 105 consists of one or more webs 105, which extend with one or more interruptions along the base plate 101 at several points between the opposite longitudinal outer edges 102. In this case, the interruptions serve to guide cables in the longitudinal direction.

On the insulating element 100, on the side of the base plate 101 opposite the spacer element 105, is arranged an insulating element geometry 107, which extends from the base plate 101 in the transverse direction away from the base plate 101. The insulating element geometry 107 comprises, for example, a base body extending substantially cylindrically in the transverse direction. Other shapes of the base body, e.g., conical, are also possible.

The spacer element 105 and the base plate 101 are preferably designed to be integral. The insulating element geometry 107 and the base plate 101 are preferably designed to be integral.

The longitudinal outer edges 102 preferably comprise a preferably barrel-shaped bulge, which is radial with respect to the transverse direction.

The longitudinal outer edges 102 are preferably shaped such that the base plate 101 can be guided in the longitudinal direction in a trapezoidal guide, a dovetail guide, or a guide with tongue and groove corresponding to the shape of the longitudinal outer edges 102.

The insulating element geometry 107 comprises one or more webs 108, which extend along its outer wall, at least in sections, in the transverse direction. The insulating element 100 particularly preferably tapers—preferably, conically—in the transverse direction towards its free end, i.e., towards the end of the insulating element geometry 107 facing away from the base plate 101. The insulating element geometry 107 is preferably cylindrical, and the webs 108 preferably taper along the transverse direction with increasing distance to the base plate 101, so that the insulating element geometry 107 and the webs 108 produce a conical centering means.

Figure 2:
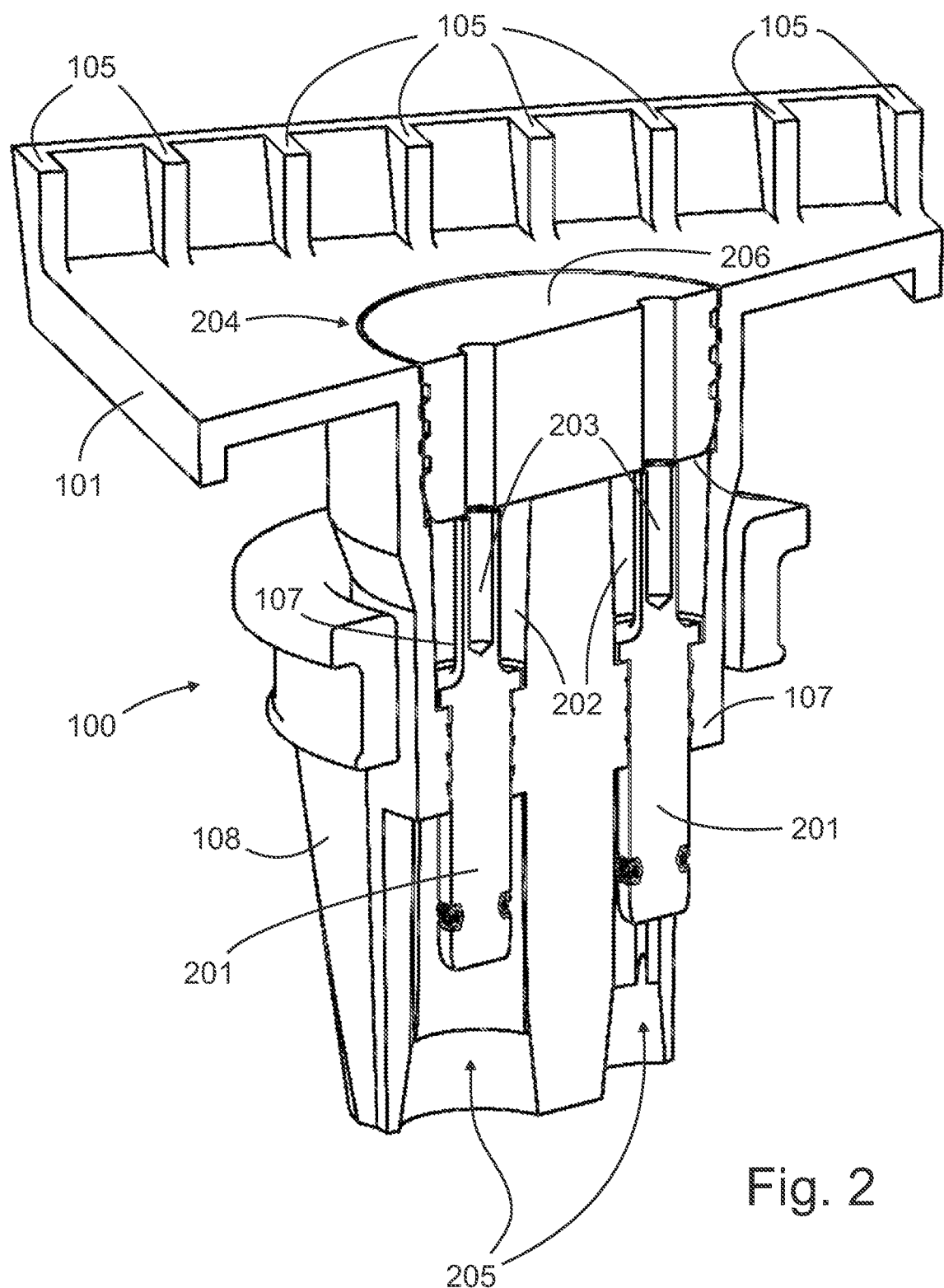
FIG. 2 illustrates a perspective sectional view through the insulating element.

FIG. 2 shows a perspective sectional view through the insulating element 100. Mounted in a pressure-tight and/or oil-tight manner in the insulating element 100 is a pin or receptacle connector contact 201, extending in the transverse direction, for electrically conductively connecting to a corresponding connection of a fuel injector.

FIG. 2 shows two pin or receptacle connector contacts 201 in respectively cylindrical openings 205 of the insulating element geometry 107. The cylindrical openings 205 can also be formed by cylindrical walls of the insulating element 100, which surround the respective cylindrical opening. The insulating element 100 can also comprise one or more cylindrical openings 205 with respectively one or more pin or receptacle connector contacts 201.

Within the insulating element geometry 107, on the side of the pin or receptacle connector contact 201 facing away from the free end of the insulating element geometry 107, is arranged a contact area 202 in which a contact means 203 is provided for electrically conductively connecting the contact pin and/or contact receptacle to a cable. The contact means preferably provides a suitable crimp connection. Another advantageous embodiment is a contour for ultrasonically connecting a stranded wire and the contact pin or contact receptacle. The contact area 202 is open towards a cable feedthrough 204. The cable feedthrough 204 leads from the contact area 202 through the base plate 101 to the side of the base plate 101 facing away from the insulating element geometry 107.

This arrangement produces an area for accommodating cables in the insulating element 100 on the side facing away from the free end of the insulating element geometry 107. On the side facing the free end of the insulating element geometry 107, no cables for contacting the connection of the injector are required. By pressing-in the electric pin or receptacle connector contact 201 in a pressure-tight and/or oil-tight manner, a pressure or oil barrier is produced.

Figure 3:
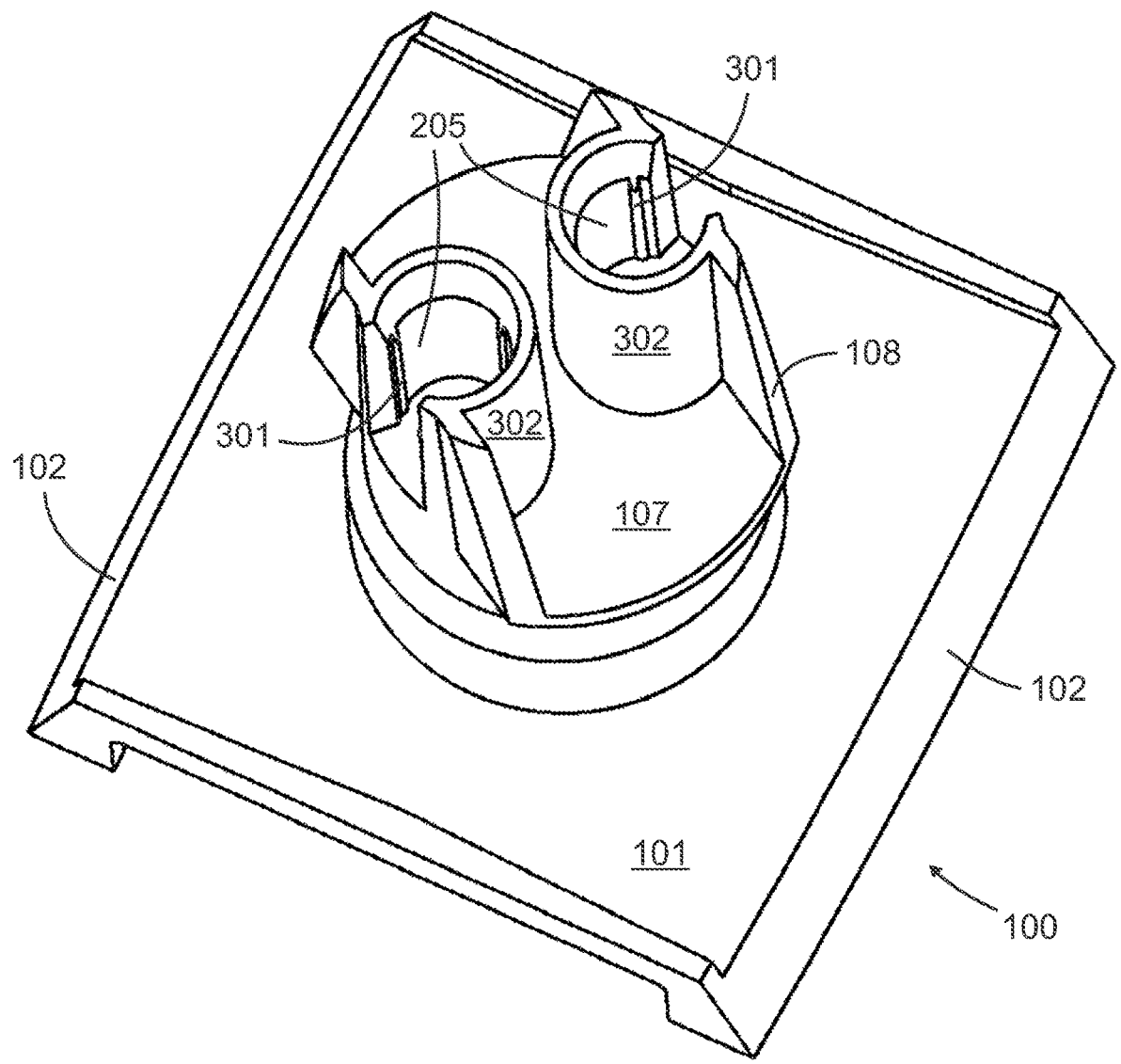
FIG. 3 illustrates a second perspective view of an insulating element.

FIG. 3 shows a second perspective view of the insulating element 100. In this example, the longitudinal outer edges 102 are designed to be held movably in the longitudinal direction in a trapezoidal guide.

In the insulating element 100 are provided two cylindrical openings 205 as accommodations, aligned in the transverse direction with the insulating element geometry 107, for a receptacle connector contact 401. This accommodation is preferably formed by a cylindrical wall 302 of the insulating element 100. The accommodations preferably respectively comprise a web 301 or several webs 301, which protrude into the cavity of the cylindrical accommodation. If a corresponding receptacle connector contact 401 enters this cavity of the cylindrical accommodations during assembly in the transverse direction as in the example, the webs 301 are pressed outwards radially to the transverse direction. In this way, the receptacle connector contact 401 is braced radially to the transverse direction with the inner surface of the respective insulating element geometry 107.

Instead of the pin connector contact 201, a receptacle connector contact can also be provided on the insulating element 100. In this case, a pin connector contact can be provided, instead of the receptacle connector contact 401.

Figure 4:
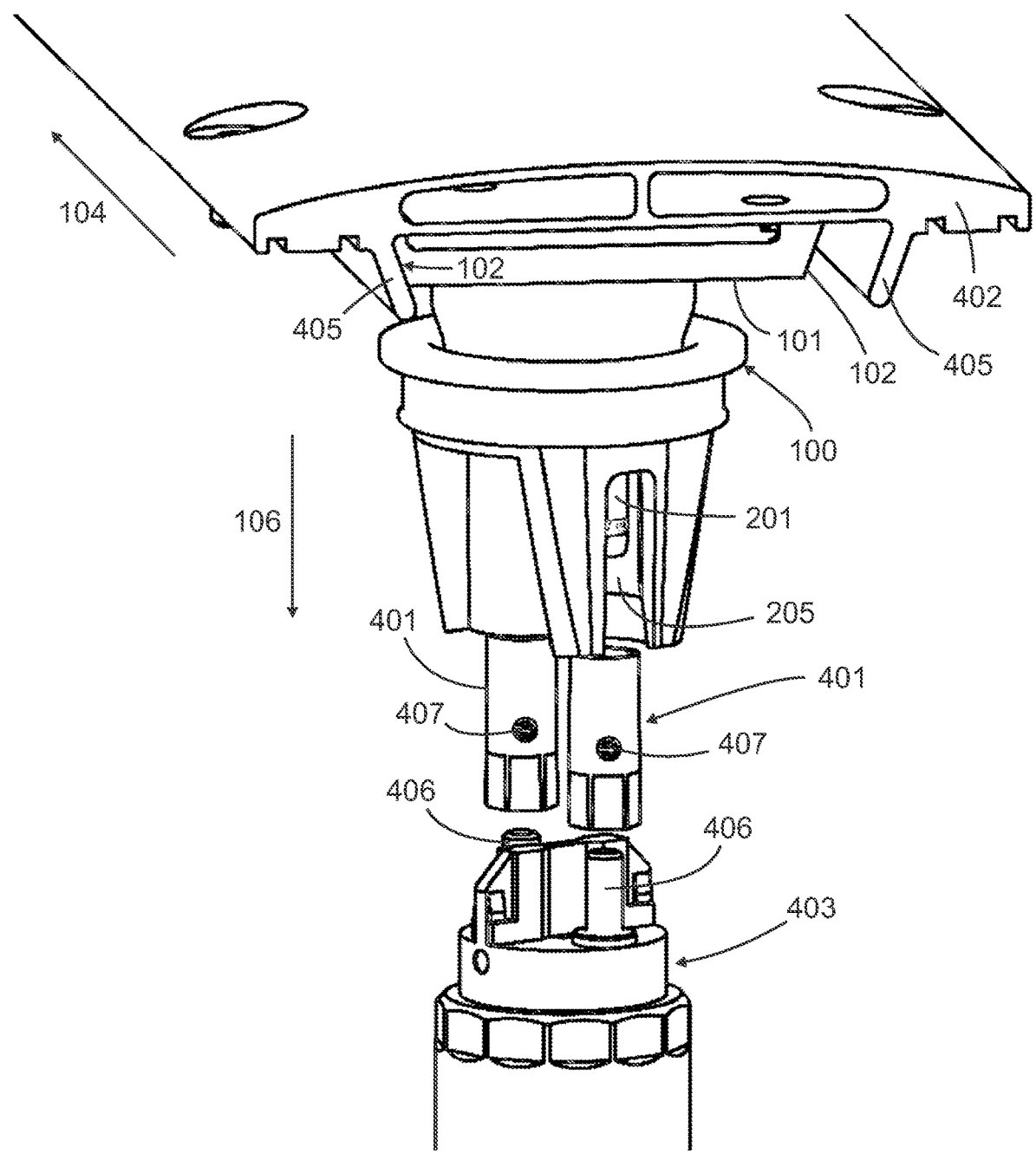
FIG. 4 illustrates a perspective view of an insulating element, a receptacle, a rail, and an injector.

FIG. 4 shows a perspective view of the insulating element 100, the receptacle connector contact 401, a rail 402, and an injector 403.

The rail 402 extends in the longitudinal direction illustrated by the arrow 104. The rail 402 comprises a trapezoidal guide 405 extending in the longitudinal direction. The trapezoidal guide 405 guides the insulating element 100 at its longitudinal outer edge. As shown in FIG. 4, the insulating element 100 is preferably guided at both opposite longitudinal outer surfaces 102 of the base plate 101 by the trapezoidal guide 405 movably in the longitudinal direction.

Instead of the trapezoidal guide 405, a dovetail guide or a guide with tongue and groove can be provided. It can also be provided to use different guide types on opposite longitudinal outer surfaces 102. As shown in FIG. 4, the guide 405 is designed as a web which extends in the longitudinal direction and rises from the rail 402 at a predefined angle to the transverse direction on the side facing the insulating element 100. The transverse direction is illustrated by the arrow 106 in FIG. 4. It can also be provided to arrange the guide 405 so as to be countersunk in the rail 402.

On its side facing the rail 402, the injector 403 comprises an electric connection 406. In FIG. 4, two electric connections 406 are provided.

In a first embodiment of the injector 403, a connection 406 is designed as a threaded machine pin with a male thread—preferably, an M3, M4, M5, or M6 male thread.

On the side facing the connection of the injector 403, the receptacle connector contact 401 has a corresponding female thread—preferably, an M3, M4, M5, or M6 female thread.

The receptacle connector contact 401 is preferably designed such that it cylindrically surrounds the female thread. On the side facing away from the female thread in the transverse direction, the receptacle connector contact 401 is, moreover, designed as counterpart of the electric pin connector contact 201.

The receptacle connector contact 401 can be connected to the pin connector contact 201 on the free end of the insulating element 100 in a releasable, force-fitted, pluggable manner.

This means that the receptacle connector contact 401 forms an adapter that can be screwed onto a connection of a fuel injector 403. Subsequently, the electric pin connector contact 201 can be plugged into the receptacle connector contact 401 in order to contact the connections of the injector 403.

In its sheath, the receptacle connector contact 401 preferably comprises a blind hole 407 that is open towards the outside. This blind hole forms an oil drain.

The rail 402 preferably consists of aluminum. The rail 402 is preferably produced in an extrusion process or milled from aluminum.

Figure 5:
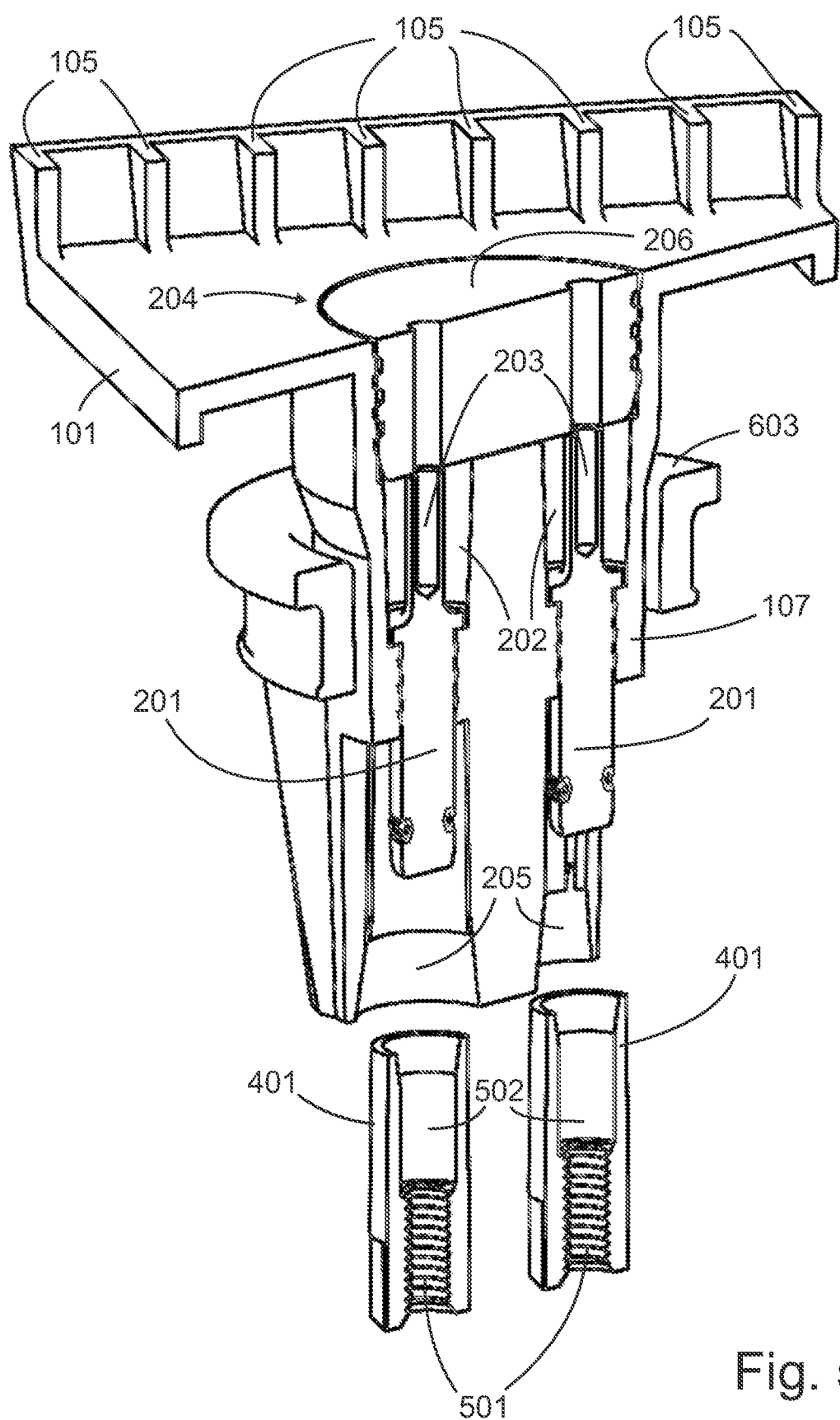
FIG. 5 illustrates a perspective sectional view through the insulating element and the receptacle.

FIG. 5 shows a perspective sectional view through the insulating element 100 and the receptacle connector contact 401. The insulating element 100 has the pin connector contact 201. On one side, the receptacle connector contact 401 comprises a contact opening 502 extending in the transverse direction and corresponding to the pin connector contact 201. On the other side, the female thread 501 extends in the transverse direction. They are electrically conductively connected within the receptacle 501.

In a second embodiment of the injector 403, the connection is designed as a connection corresponding to the pin or receptacle connector contact 201.

Preferably, no machine thread is provided on the injector connection, but the connection corresponding to the pin or receptacle connector contact 201 is arranged on the injector instead of a machine thread. The receptacle connector contact 401 is then omitted.

The pin or receptacle connector contact 201 and the corresponding connection are preferably designed to be oil-tight and/or pressure-tight with respect to the contact area 202.

Figure 6:
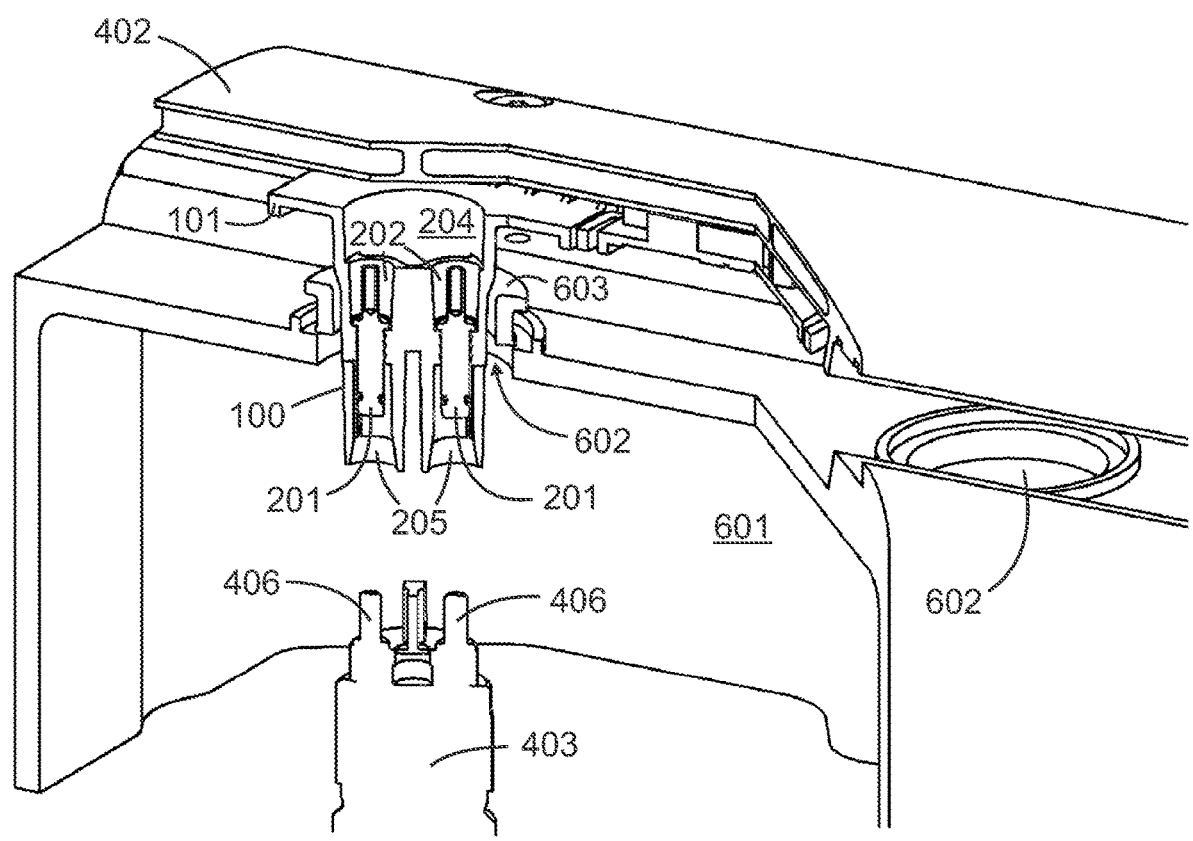
FIG. 6 illustrates a schematic sectional view through an arrangement of the fuel injector and the plug connector on a motor or valve cover.

FIG. 6 shows a schematic sectional view through an arrangement of a fuel injector 403 in a motor or valve cover 601.

The rail 402 holds the insulating element 100 in a form-fitting manner. The insulating element 100 extends in this case from the base plate 101 in the transverse direction towards the side facing away from the rail 402. The rail 402 is preferably, at least in sections, designed as a cover of the motor or valve cover 601. In this case, the side of the rail 402 out of which the insulating element 100 protrudes forms the side of the rail 402 facing the motor or valve cover 601.

The motor or valve cover 601 preferably comprises a passage 602 which corresponds to the insulating element and through which the insulating element 100 can be guided through the motor or valve cover 601.

It is particularly advantageous if a seal 603, extending radially around the insulating element 100 protruding out of the rail in the transverse direction, is arranged on the insulating element 100 on a side of the insulating element 100 facing away from the rail 402. The seal 603 is preferably an elastomer-compensating ring or a silicone seal.

The insulating element 100, the seal 603, and the corresponding feedthrough 602 are preferably designed to seal the motor or valve cover 601 in a pressure-tight and/or oil-tight manner on the feedthrough 602.

The dimension of the insulating element 100 in the transverse direction is preferably designed such that a plug connection between the pin or receptacle connector contact 201 and the corresponding connection 406 of the fuel injector 403 is established during installation, i.e., when the insulating element 100 is inserted through the opening 602. If the receptacle connector contact 401 is provided, its dimension in the transverse direction is alternatively or additionally designed correspondingly.

The dimension of the insulating element 100 in the transverse direction is preferably designed such that the seal 603 is guided in the transverse direction towards the rail 402 when the insulating element is inserted through the opening 602. The insulating element 100 preferably tapers radially in the transverse direction toward the free end of the insulating element 100. Particularly preferably, the insulating element 100 is conical or additionally comprises the webs 108.

In this way, the seal 603 is expanded when the insulating element 100 is inserted into the opening 602. Said opening is thereby tightly sealed when installed into the motor or valve cover 601. The—in particular, conical—shape of the insulating element 100 tapering in this way moreover facilitates the centering of the insulating element 100 with respect to the opening 602 when inserting the insulating element 100 through the opening 602. This facilitates assembly in the motor or valve cover 601.

Figure 7:
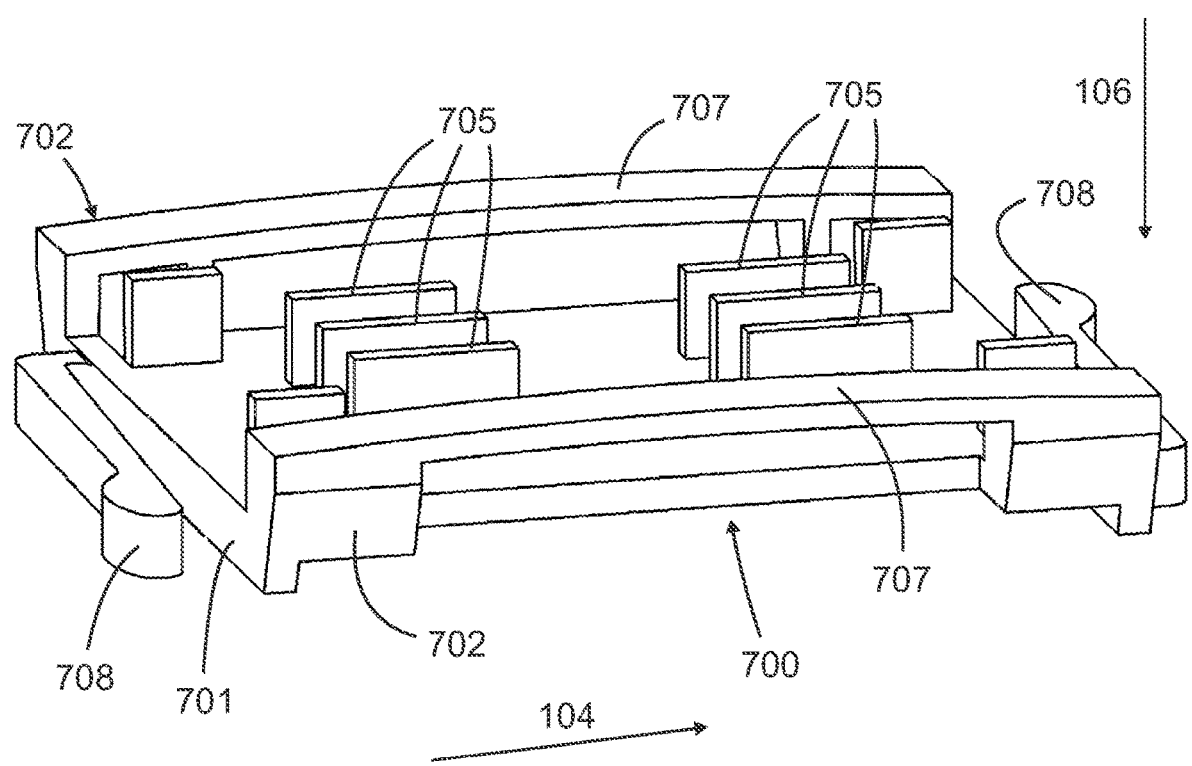
FIG. 7 illustrates a schematic of a holding element.

FIG. 7 schematically shows a holding element 700.

The holding element 700 comprises a base plate 701 with two longitudinal outer edges 702 extending on opposite sides of the base plate 700 in the longitudinal direction illustrated by an arrow 104.

On the holding element 700 is arranged a spacer element 705, which extends from the base plate 701 in the transverse direction, illustrated by an arrow 106, away from the base plate 701. In the example of FIG. 7, the spacer element 705 consists of one or more webs 705, which extend with one or more interruptions along the base plate 701 at several points in parallel to the opposite longitudinal outer edges 702. The distances that are maintained in the direction from one longitudinal outer edge 702 to the other longitudinal outer edge 702 between the webs 705 serve as cable guides in this case.

A spring element 707 extending in the longitudinal direction along the longitudinal outer edges is arranged on the holding element 700 on the side on which the spacer element 705 is arranged. The spring element 707 extends from the base plate 701 in the transverse direction away from the base plate 701.

The spacer element 705 and the base plate 701 are preferably designed to be integral. The spring element 707 and the base plate 701 are preferably designed to be integral.

The longitudinal outer edge 702 preferably comprises a preferably barrel-shaped bulge, which is radial with respect to an axis orthogonal to the longitudinal direction and orthogonal to the transverse direction, and which forms the spring element 707.

The longitudinal outer edges 702 are preferably shaped such that the base plate 701 can be guided in the longitudinal direction in a trapezoidal guide, dovetail guide, or a guide with tongue and groove corresponding to the shape of the longitudinal outer edges 702.

On an outer contact surface of the base plate 701 facing the at least one insulating element 100, the holding element 700 comprises a movable—preferably, resilient—finger 708, which extends in parallel to the outer contact surface between the insulating element 100 and the holding element 700 when they are guided in the guide 405. The spring element 707 ensures a pre-loading in the guide 405—for example, in the trapezoidal guide.

Figure 8:
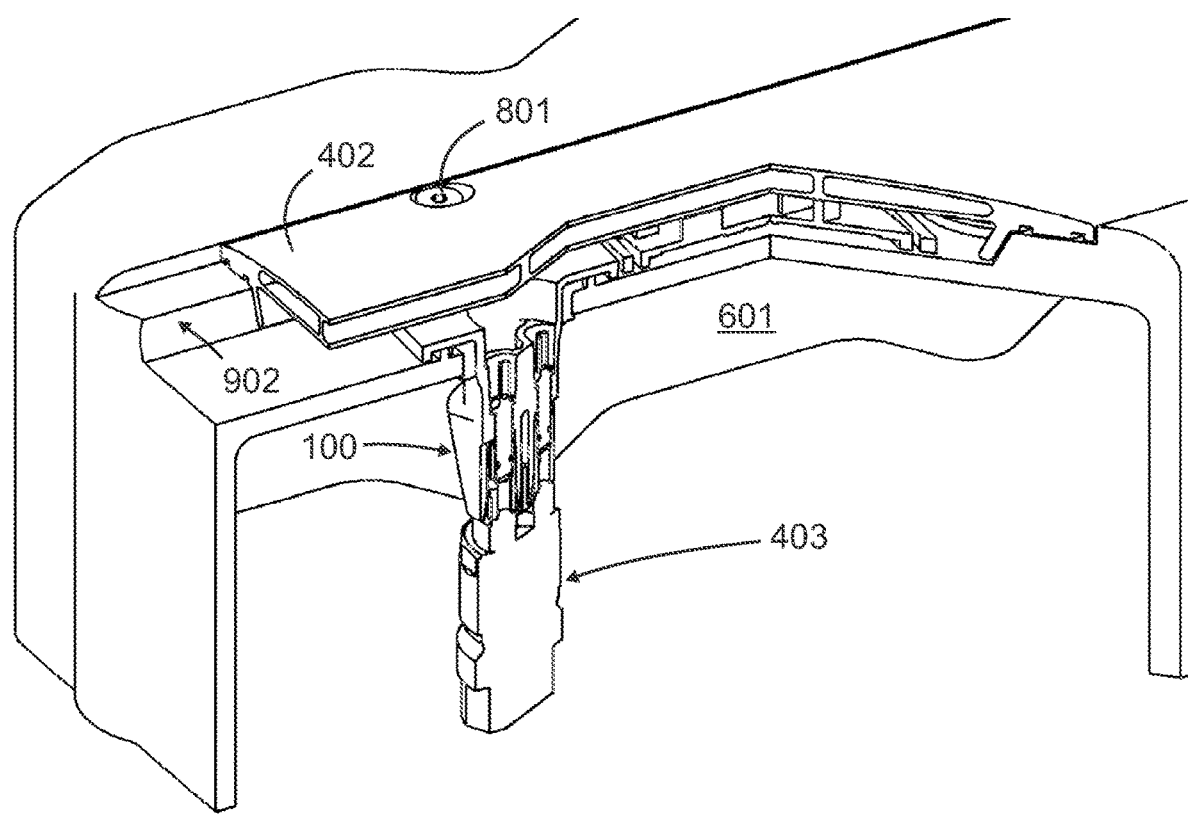
FIG. 8 illustrates a schematic sectional view through injector, plug connector, and motor or valve cover.
Figure 9:
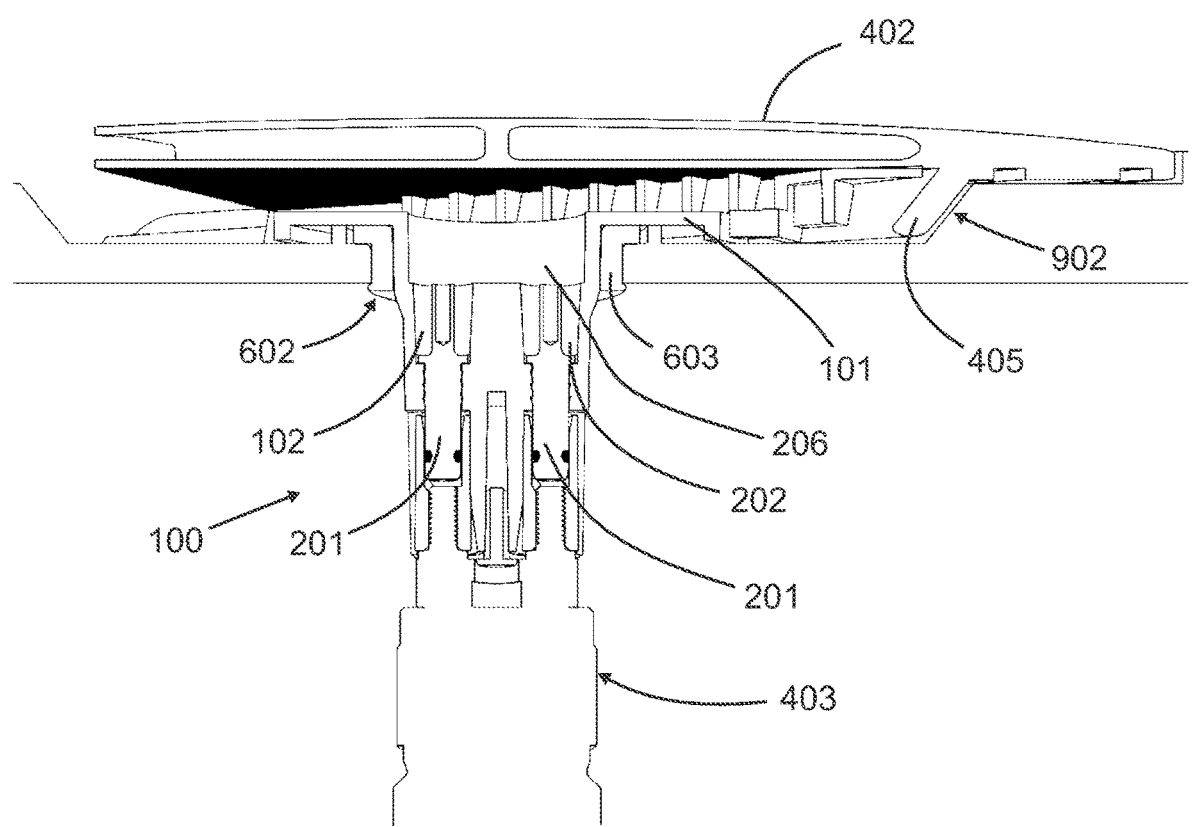
FIG. 9 illustrates a schematic sectional view through injector, plug connector, and motor or valve cover.

FIG. 8 and FIG. 9 show sectional views through the injector 403, the insulating element 100, the rail 402, and the motor or valve cover 601 in an installation location in which the plug connector is plugged into the injector 403.

FIG. 8 shows a connection means 801, which releasably connects the rail 402 to the motor or valve cover 601. The connection means 801 is, for example, a screw which has a male thread, is guided through a continuous opening arranged in the rail 402, and is screwed into a corresponding accommodation arranged in the motor or valve cover 601 and having a female thread.

The side 902 of the rail 402 on which the guide 405 and the insulating element 100 are arranged geometrically corresponds in this case, as shown in FIG. 9, to an outer wall of the motor or valve cover 601. The guide 405 is, in this case, arranged at a distance from the motor or valve cover 601. In this way, direct contact between the guide 405 and the motor or valve cover 601 is avoided. As a result, twisting of the insulating element 100 in the guide 405 is avoided. This is achieved, for example, by an appropriate profile of the rail 402 or the arrangement of spacer elements on the rail 402.

In this case, the insulating element 100 is braced in the transverse direction with the rail 402 and the motor or valve cover 601 as shown in FIG. 9. The expansion of the seal 603 is in this case limited by the preferably conical part of the insulating element 100 protruding from the base plate 101 in the transverse direction and by the base plate 101 extending substantially orthogonally to the transverse direction and the opening 602 corresponding to the insulating element 100. In this way, the seal 603 is pressed outwards radially with respect to the transverse direction and thus seals between the insulating element 100 and the motor or valve cover 601 in an oil-tight and/or pressure-tight manner.

As a result of the oil-tight and/or pressure-tight compression of the pin or receptacle connector contact 201, the insulating element 100 itself is designed to be oil-tight and/or pressure-tight.

This produces an oil and/or pressure barrier, which separates the area for the cables from the area in which the fuel injector 403 is arranged.

Another seal 206 is arranged in the cable feedthrough 204. This seal prevents the intrusion of dirt or moisture into the contact area 202. This seal 206, moreover, holds the cables (not shown) that lead to the contact area 202. In this way, the cables and their electric connection to the pin connector contacts 201 are protected in case of vibration.

Figure 10:
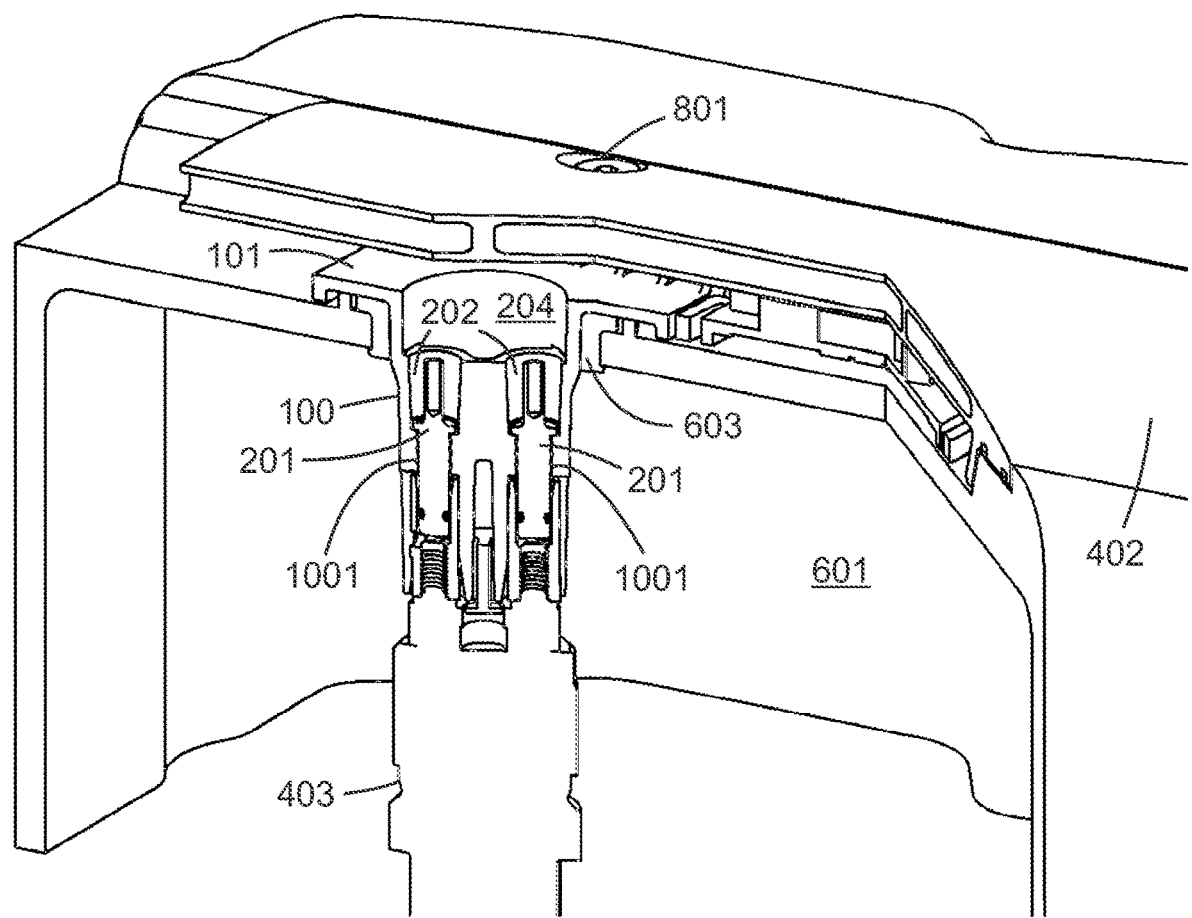
FIG. 10 illustrates a plug connector in a plugged-in state.

FIG. 10 shows another sectional view through injector 100, motor or valve cover 601, rail 402, and injector 403.

FIG. 10 shows a plug connector in a plugged-in state. In this plugged state, the injector 403 is contacted. The sealing takes place, as described, by the seal 603. This seal 603 is preferably designed as a seal 603 extending around the insulating element 100 radially to the transverse direction. The seal 603 is preferably a silicone-compensating ring. With its help, an over- and/or underpressure seal is realized.

FIGS. 8, 9, and 10 show the embodiment with the receptacle connector contact 401. Instead of the receptacle connector contact 401, the pin or receptacle connector contact 201 can also be plugged directly into a corresponding connection or several corresponding connections on the injector 403.

Figure 11:
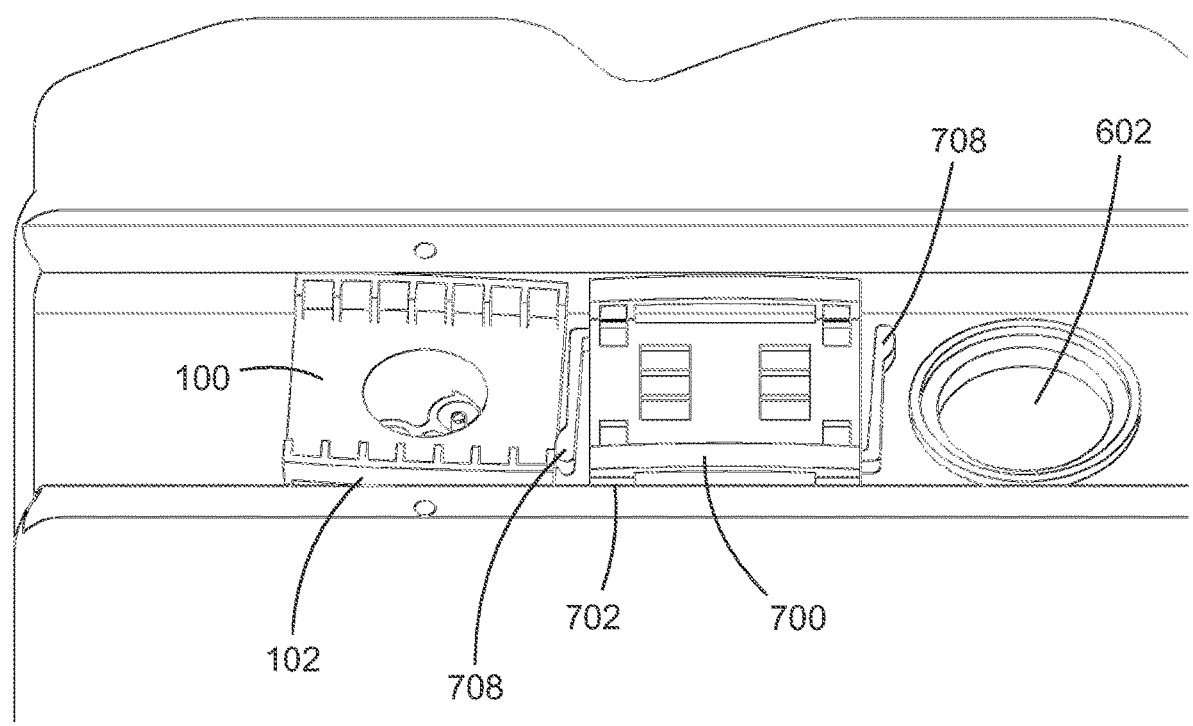
FIG. 11 illustrates a view of an arrangement of the insulating element and the holding element on the motor or valve cover.
Figure 12:
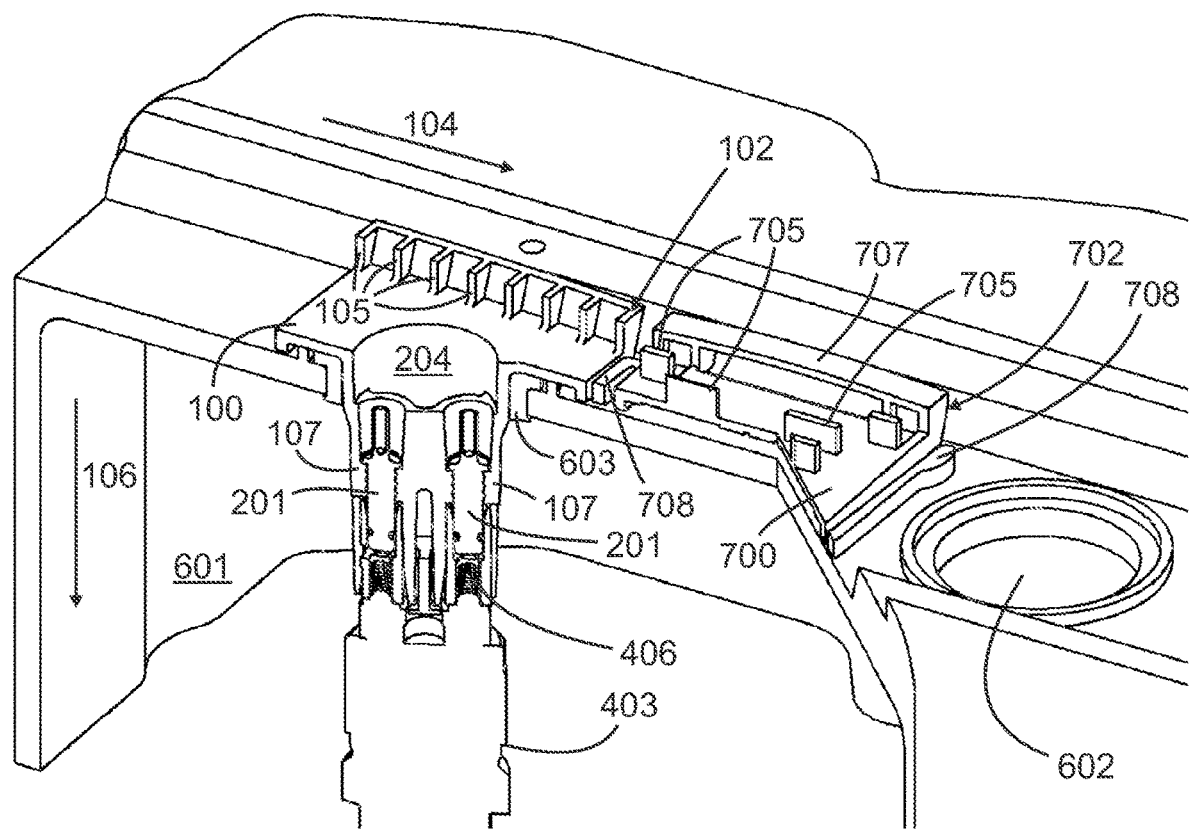
FIG. 12 illustrates another view of an arrangement of the insulating element and the holding element on the motor or valve cover.

FIGS. 11 and 12 show two views of an arrangement of the insulating element 100 and the holding element 700 on the motor or valve cover 601. The finger 708 on the holding element 700 extends between the holding element 700 and the insulating element 100.

The finger 708 is preferably resilient. In the rest position, the finger 708 is spaced apart from the base plate 701 and thus allows a movement in the longitudinal direction and a rotational movement of the insulating element 100 with respect to the holding element 700. The rotational movement of the insulating element 100 is made possible by the barrel shape of the longitudinal outer surface 102.

At its longitudinal outer surfaces 702, the holding element 700 is guided in the guide 405 (not shown). The spring element 707 extends in the longitudinal direction in a region in which the guide 405 holds the holding element 700 in a formfitting manner with respect to the transverse direction. The bulge of the longitudinal outer wall 702 of the holding element 700 is designed such that the holding element 700 is held in a force-fitted manner in the guide 405. The insulating element 100 is thus guided displaceably—movably—in the longitudinal direction substantially up to the holding element 700. As a result, the insulating element 100 can be pre-positioned with respect to the rail 402. The finger 708 allows for an additional compensation of tolerances of the position of the insulating element 100 in the longitudinal direction and in the transverse direction in a direction of rotation about an axis. The axis preferably extends through the insulating element. The axis is preferably an axis of symmetry or an axis of rotational symmetry of the insulating element.

The base plate 701 of the holding element 700 is preferably dimensioned suitably for the distance of the base plate 101 of the insulating element 100 such that the insulating element 100 is held in the longitudinal direction of the rail 402 on said rail such that it is positioned in the transverse direction such that it is aligned with an opening 602 of the motor or valve cover 601 when the rail 402 is mounted on the motor or valve cover 601.

It is advantageous if corresponding insulating element 100, connection 406, receptacle connector contact 401, and pin connector contact 201 are arranged by the pre-positioning such that they are substantially aligned with one another. Any existing tolerances can be compensated for by the rotational movement or longitudinal movement of the insulating element 100 as well as the possible radial deformation in the transverse direction of the seal 603. The base plate 101 can, moreover, be designed with respect to the guide 405 such that a predefined movement in a direction orthogonal to the longitudinal direction and to the transverse direction is possible. In this way, further compensation possibilities during assembly are created.

The holding element 700 and the insulating element 100 are preferably dimensioned such that, when they are arranged alternatingly on the rail 402, the spacer elements of the insulating elements 100 are positioned [at] openings 602, corresponding to the spacer elements, of the motor or valve cover element 601.

It is, in particular, advantageous if several, alternatingly arranged insulating elements 100 and holding elements 700 are arranged in the rail 402. Two or more holding elements 700 can also be arranged between two insulating elements 100.

The rail 402 of the type described forms a preferably integral cover for a section of the motor or valve cover 601.

Figure 13:
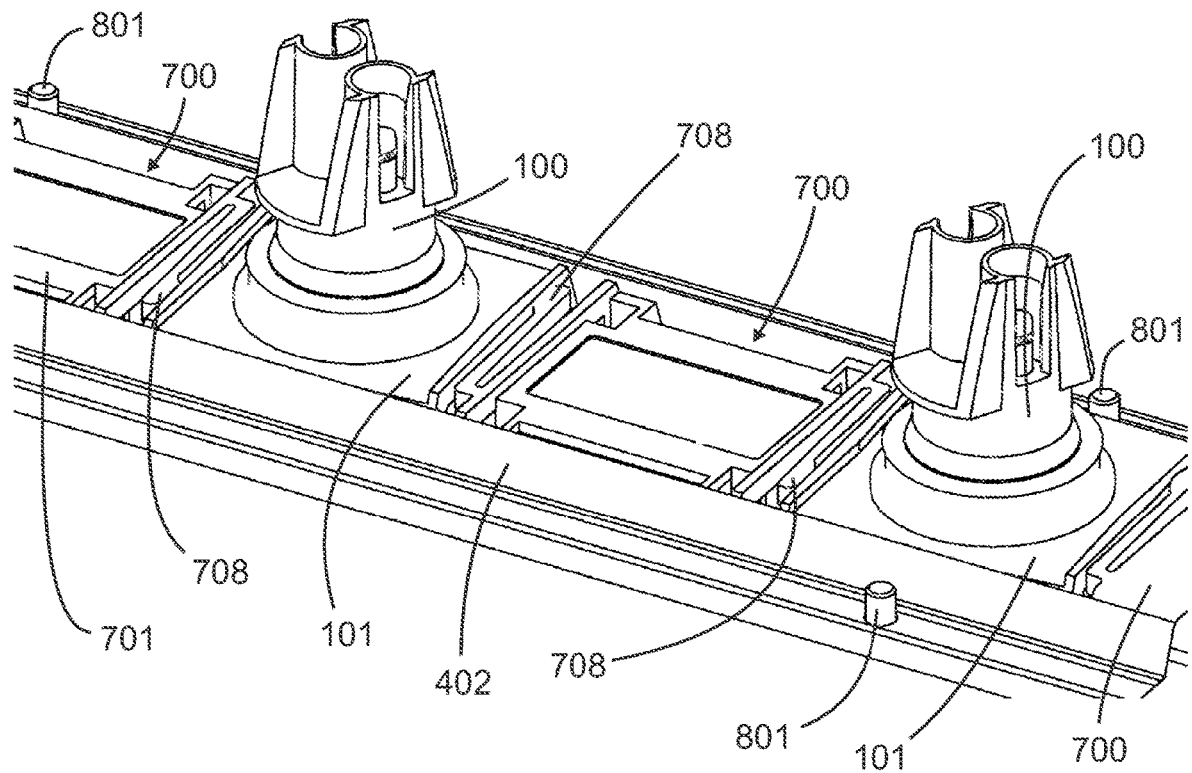
FIG. 13 illustrates an exemplary alternating arrangement of holding elements and insulating elements.
Figure 14:
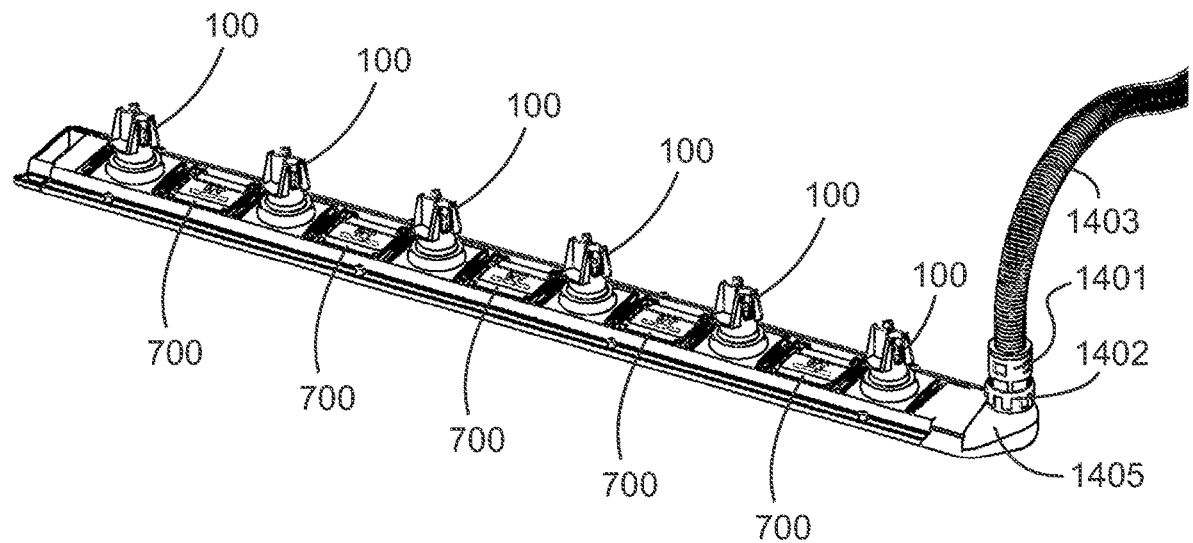
FIG. 14 illustrates an exemplary alternating arrangement of holding elements and insulating elements with a cable feedthrough.

FIGS. 13 and 14 show examples of an alternating arrangement of holding elements 700 and insulating elements 100. FIG. 14 moreover shows a cable guide 1401 with a cable feedthrough 1402 on one end of the rail 402.

The cable feedthrough 1402 and the cable guide 1401 are preferably designed to be two parts. A screw, plug, or electrical plug connection can be provided between the two parts.

The cable guide 1401 is preferably designed as an adapter. The cable feedthrough 1402 is preferably designed as an accommodation for the adapter. The two preferably have corresponding threads.

The cable guide 1401 connects the cable feedthrough 1402 and a flexible tube 1403. The tube is preferably a corrugated tube. The adapter is preferably a corrugated tube adapter.

The cable feedthrough 1402 and the cable guide 1401 are preferably arranged on an end piece 1405. The end piece 1405 is mounted on one of the ends of the rail 402. The end piece 1405 is preferably connected to the rail 402 in a formfitting manner. Catches, for example, are provided for positively locking the end piece 1405 and the rail 402. A spring strap arranged on the end piece 1405 preferably engages in a corresponding accommodation of the rail 405.

On its side facing away from the end of the rail 402 in the longitudinal direction, the end piece 1405 preferably comprises a resilient finger. This resilient finger is arranged as described for the holding element 700 and acts, as described there, on a holding element 100 or an insulating element 100 arranged adjacently in the longitudinal direction in the rail.

Figure 15:
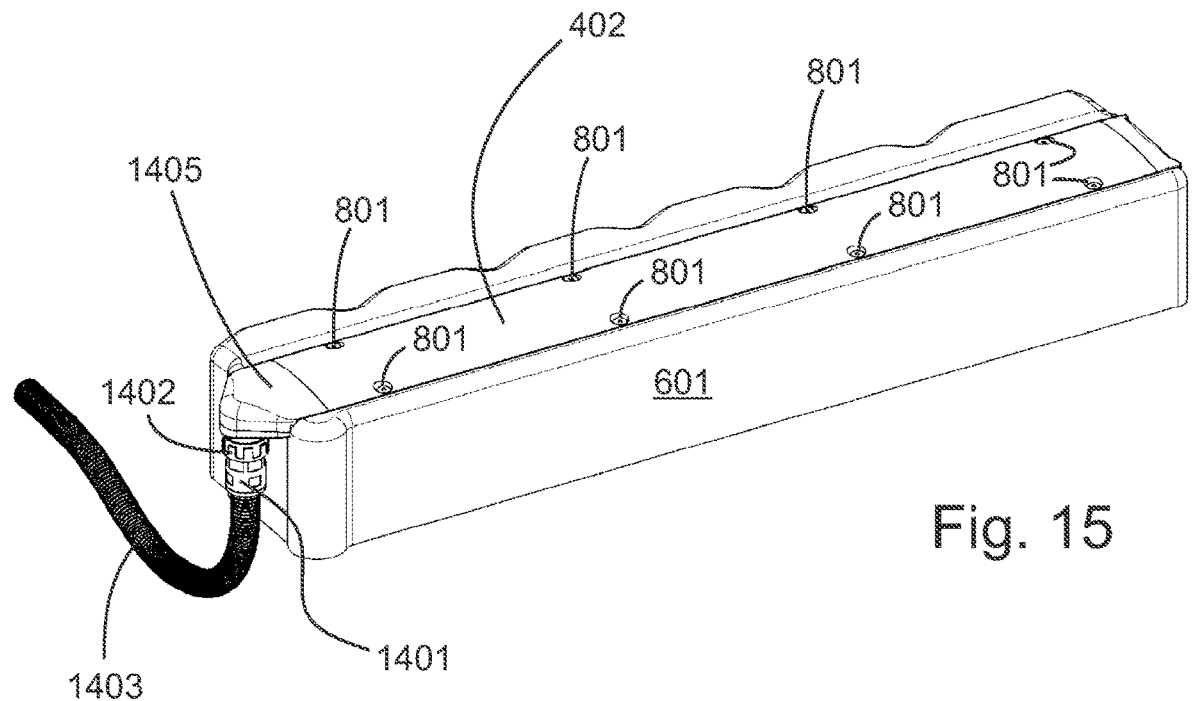
FIG. 15 illustrates a preferred plug connector with several insulating elements in the mounted state.
Figure 16:
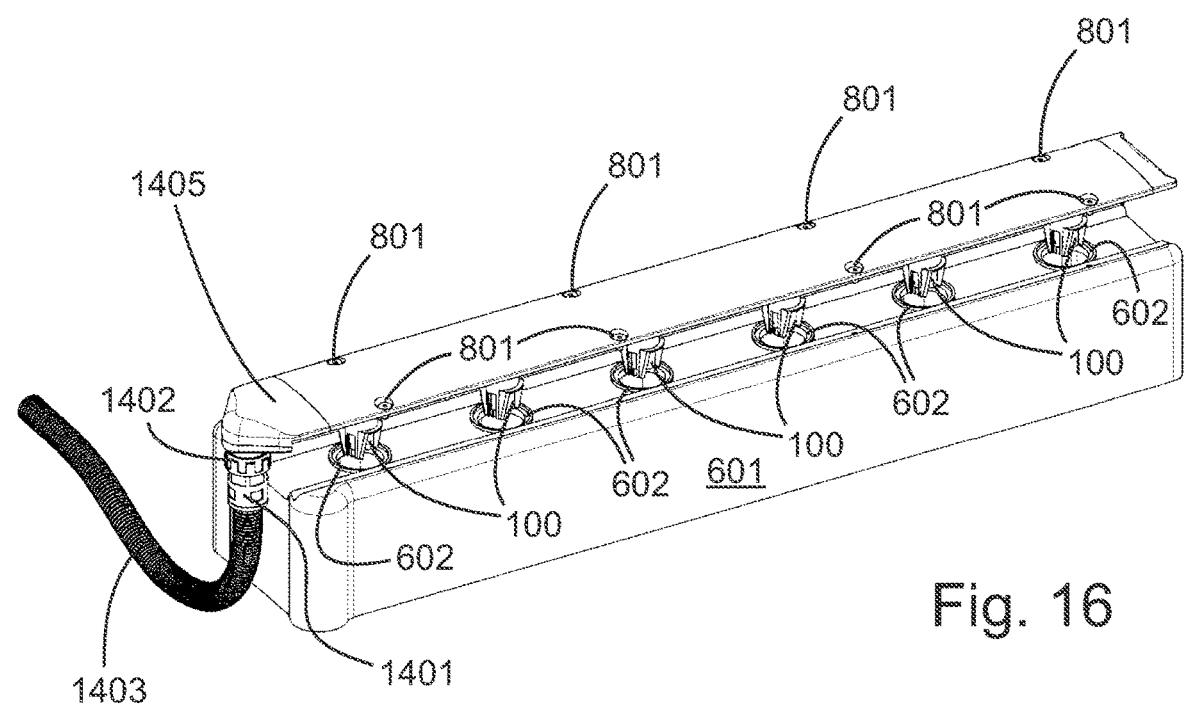
FIG. 16 illustrates a preferred plug connector with several insulating elements before assembly.

FIG. 15 and FIG. 16 show a preferred plug connector with several insulating elements. In FIG. 15, the plug connector is mounted on the motor or valve cover 601 using connection means 801.

FIG. 16 shows the plug connector at a distance from the motor or valve cover 601. The plug connector has the rail 402 and several insulating elements 100 arranged thereon. Said insulating elements are held in the rail 402 by the guide 405 in a formfitting manner. As a result, they are arranged in a loss-proof manner. The pre-positioning suitable for the openings 602 takes place by means of the dimensioning and arranging of the base plates 701 of the holding elements 700 and the dimensioning and arranging of the base plates 101 of the insulating elements 100 in the rail 402.

As a result, all insulating elements 100 can simultaneously be inserted through the openings 602 into the motor or valve cover 601 by means of a movement of the rail 402 in the transverse direction toward the motor or valve cover 601. This significantly facilitates assembly and disassembly, since all injectors 403 can be contacted or plugged in simultaneously.

The cable guide 1401 and the cable passage 1402 allow for an orderly cable guidance in the engine compartment and prevent pinching of individual cables during mounting of the rail 402.

The connection means 801 is preferably a screw that releasably mounts the rail 402 as cover on the motor or valve cover 601. On the motor or valve cover 601, scraper rings can be provided that surround the openings 602 and rise from the motor or valve cover 601 in the direction of the rail 402. As a result, the intrusion of dirt or water during assembly or disassembly of the plug connector can be avoided. The insulating element 100 and/or the rail 402 can in this case comprise corresponding accommodations for the scraper rings.

Figure 17:
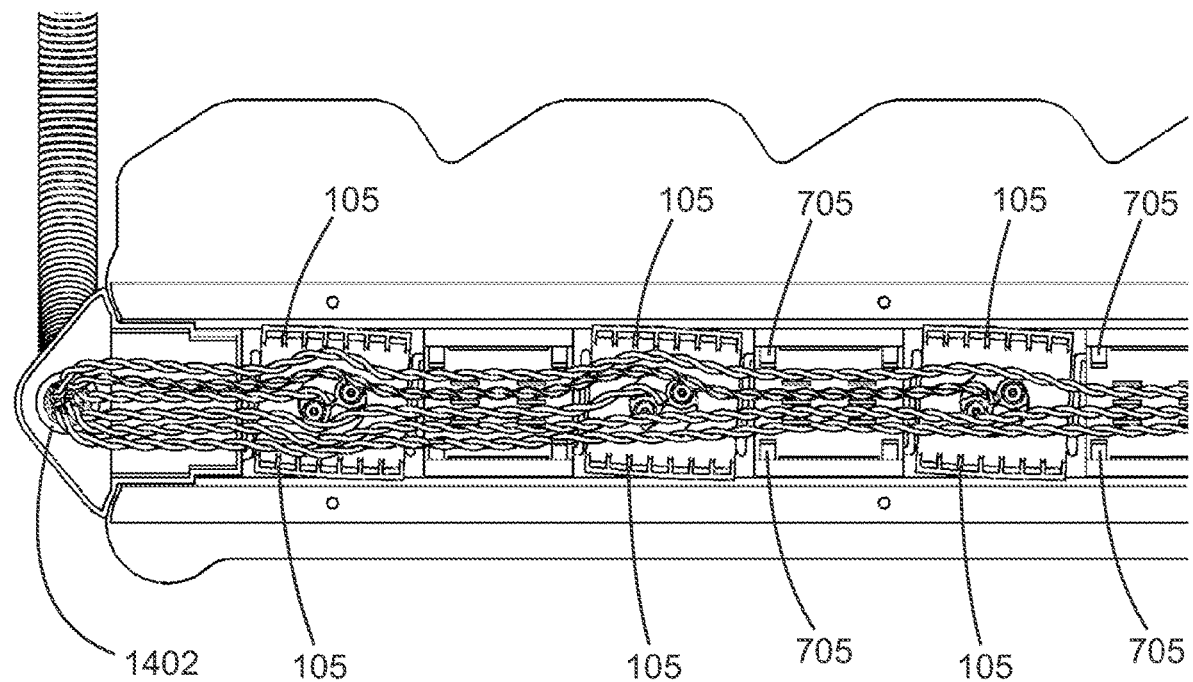
FIG. 17 illustrates a top view of the motor block with guided cables.
Figure 18:
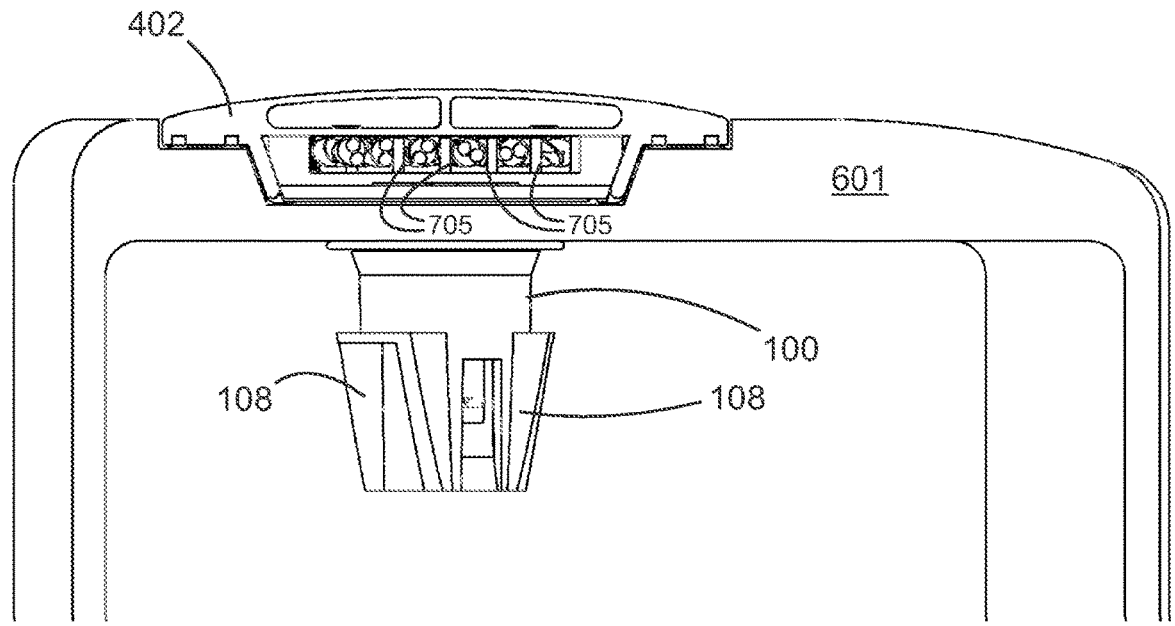
FIG. 18 illustrates a cross-section of a rail with guided cables.

FIGS. 17 and 18 shows a cross-section and a top view of the rail 402, in which a cable guide formed by spacer elements 105 and 705 is illustrated.

Twisted pair cables are preferably laid from the end of the rail 402 on which the cable feedthrough 1402 is arranged to the contact areas 204 to be respectively contacted in the insulating elements 100. The spacer elements 105 and 705 prevent pinching of the cables in the transverse direction. The spacer elements 105 and 705 form stops that guide the cables in the longitudinal direction. By appropriate dimensioning of the cables and the spacer elements, it can be provided that spacer elements 105 and 705, respectively arranged adjacently to each other, guide and hold the cables in a force-fitted manner in the transverse direction.

Figure 19:
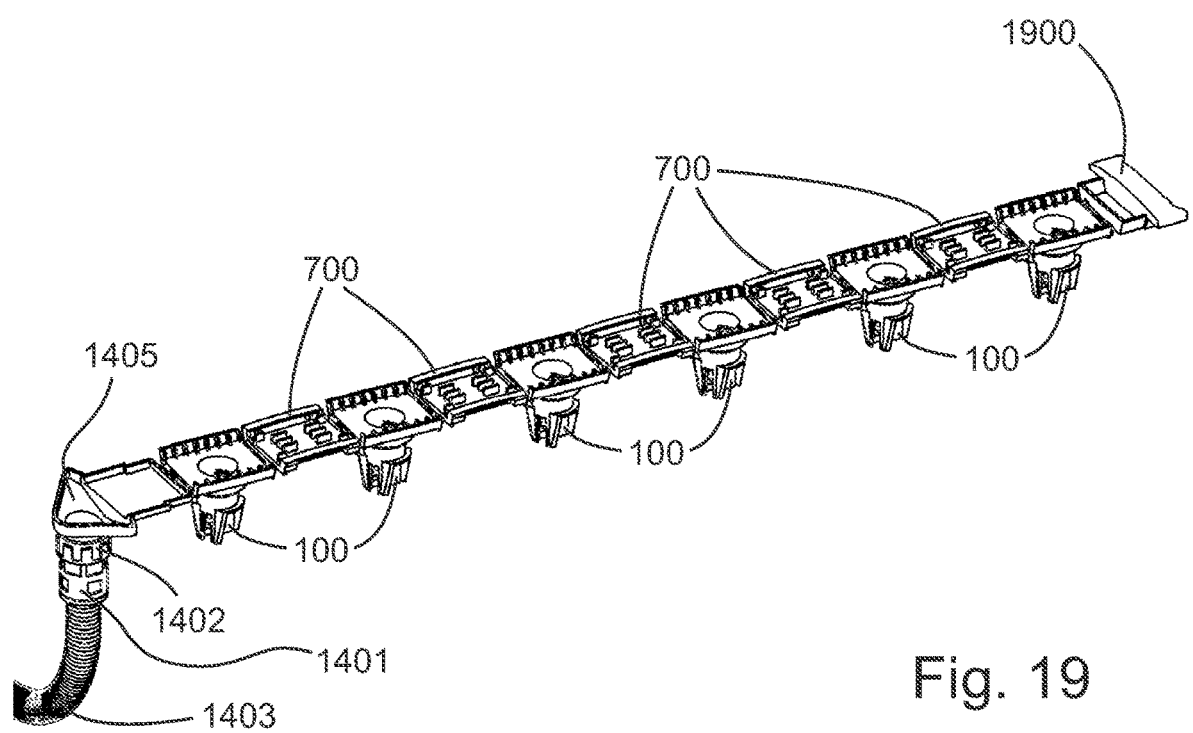
FIG. 19 illustrates another view of the plug connector without rail and without cable.
Figure 20:
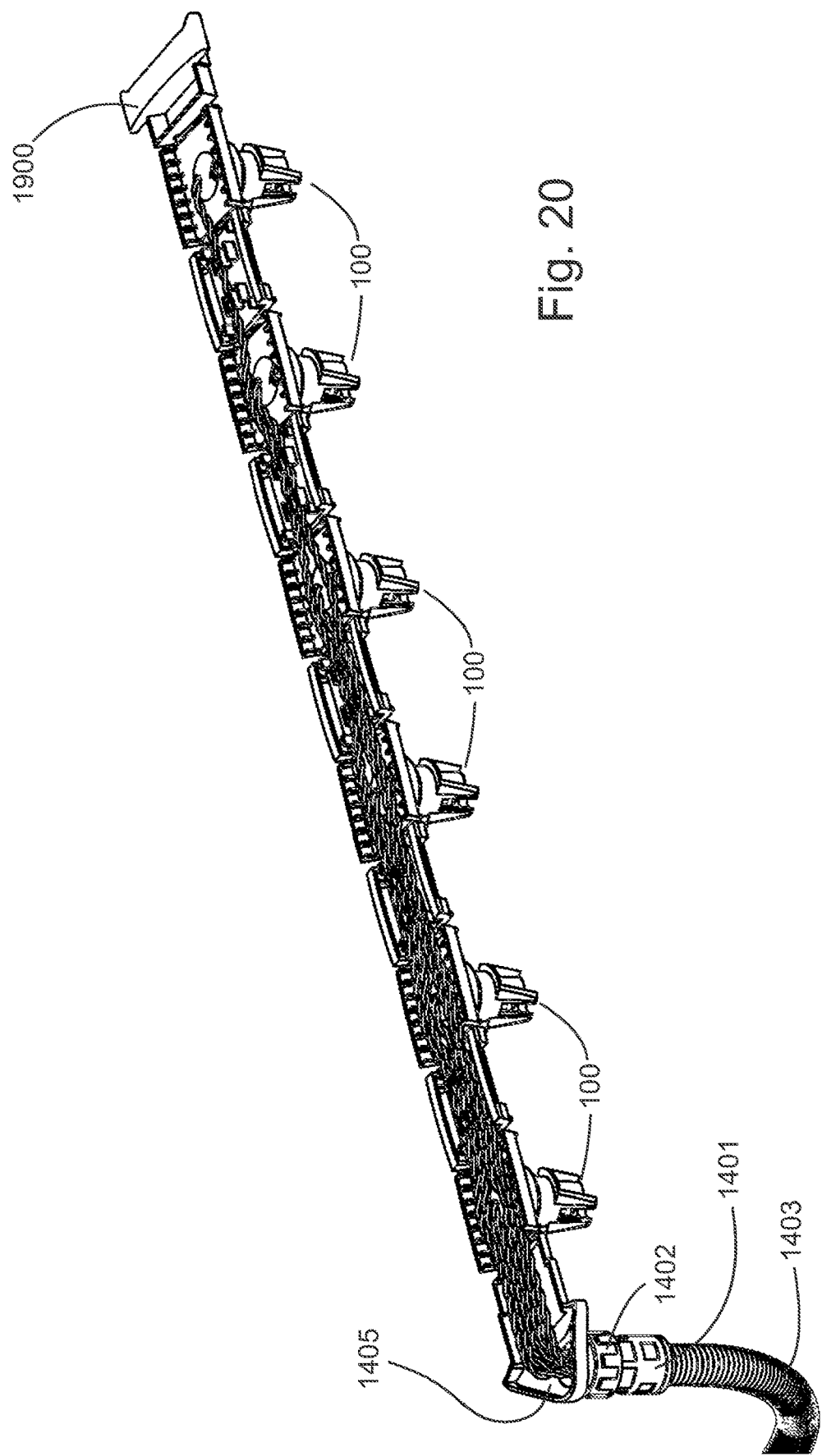
FIG. 20 illustrates another view of the plug connector without rail and with cable.

FIGS. 19 and 20 show additional views of the plug connector with or without cables, in which the rail 402 is not shown. An end element 1900 of the rail 402 can be provided on the end of the rail 402 that is opposite the cable feedthrough 1402. As described for the end piece 1405, the end element 1900 is mounted on the opposite side of the rail

402 in the longitudinal direction. The end element 1900 preferably comprises a resilient finger as described for the end piece 1405.

The end piece 1405 and the end element 1900 are, particularly preferably, fixed in a formfitting manner on the motor or valve cover. This is carried out, for example, when firmly screwing the rail to the motor or valve cover 601.

Figure 21:
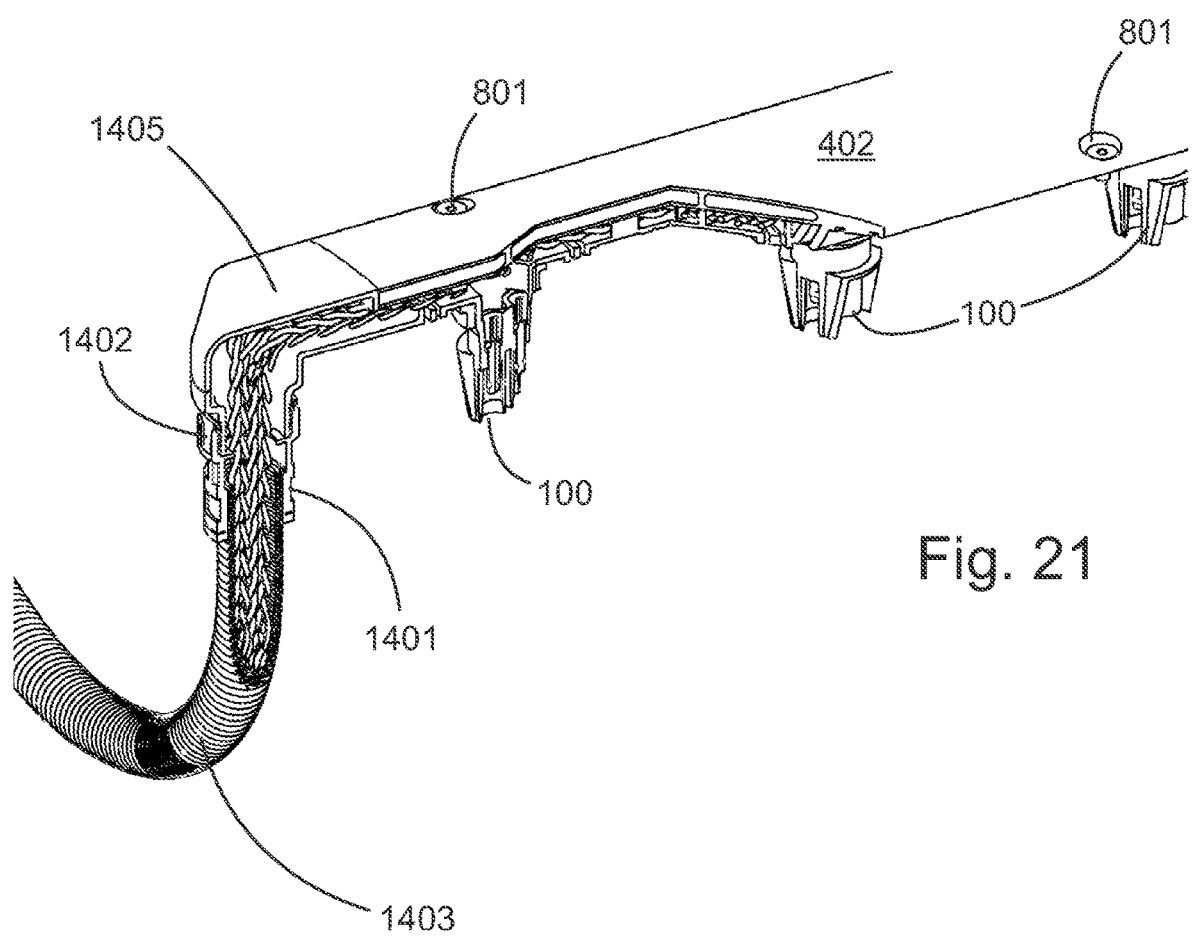
FIG. 21 illustrates an interior view of the cable guide with cable feedthrough.

FIG. 21 shows an interior view of the cable guide with cable feedthrough 1402. The cables are arranged outside the motor or valve cover 601 and are protected from oil, oil vapor, and pressure in the engine compartment by means of the oil-tight and/or pressure-tight pressing-in of the pin or receptacle connector contact 201 as well as the seal 603. Moreover, the temperature on the side of the insulating element 100 facing away from the motor or valve cover 601 is less than the temperature inside the motor or valve cover 601. For this reason, the cables used do not need to be oil-tight or pressure-tight and can also be designed for lower temperatures.

The engine compartment itself is free of individual cables and plug connectors as a result of the cable feedthrough 1402 and the cable guide 1401. In the embodiments shown, an intermediate frame for fixing and feeding the connection cables through to the outside is not necessary.

Instead of the twisted cables, other cables can also be used. A plate with rails 402 extending in parallel can also be provided.

The invention claimed is:

1. A plug connector for connecting to an electric connection of a fuel injector of an internal combustion engine, the plug connector comprising:
   a rail extending in a longitudinal direction; and
   at least one insulating element arranged in a linearly movable manner in the longitudinal direction relative to the rail;
   wherein the at least one insulating element protrudes out of the rail in a transverse direction, the at least one insulating element comprising a connector contact configured to electrically connect to the electric connection of the fuel injector in an oil-tight and releasable manner on a side which faces away from the rail in the transverse direction,
   wherein the rail comprises a guide extending in the longitudinal direction, said guide configured to linearly guide the at least one insulating element relative to the rail in the longitudinal direction and hold the same in a formfitting manner in the transverse direction relative to the rail, and
   wherein the at least one insulating element is configured to rotate about an axis in the transverse direction relative to the rail.

2. The plug connector according to claim 1, further comprising at least one holding element held by the guide in a force-fitted manner movably in the longitudinal direction and arranged adjacent in the longitudinal direction to the at least one insulating element.

3. The plug connector according to claim 2, further comprising at least one spacer element extending in the transverse direction and positioned between the rail and the at least one insulating element or positioned between the rail and the at least one holding element, wherein the at least one spacer element is designed as a cable guide extending in the longitudinal direction between the rail and the at least one insulating element or between the rail and the at least one holding element.

4. The plug connector according to claim 3, wherein the at least one spacer element is arranged on the at least one insulating element or the at least one holding element on a side facing the rail.

5. The plug connector according to claim 4, wherein the at least one spacer element and the at least one insulating element or the at least one holding element are be integral.

6. The plug connector according to claim 2, wherein the at least one holding element comprises a barrel-shaped bulge in the transverse direction, wherein the bulge is configured to interact with an opposite inner edge of the rail in order to produce, in the transverse direction, a predefined pre-loading that clamps the at least one holding element into the rail.

7. The plug connector according to claim 2, wherein one of the at least one holding element or the at least one insulating element comprises a movable resilient finger on an outer contact surface facing the at least one insulating element or the at least one holding element, wherein the finger extends parallel to the outer contact surface.

8. The plug connector according to claim 1 further comprising:
   a cable feedthrough on one end of the rail in the longitudinal direction configured to allow cables to be guided into the plug connector; and
   a cable guide positioned outside the rail, wherein the cable guide is tube-like or flexible.

9. The plug connector according to claim 1, wherein the at least one insulating element comprises a barrel-shaped bulge which is radial with respect to the transverse direction, wherein the bulge is configured to interact with an opposite inner edge of the rail and allow the at least one insulating element to rotate about the axis in the transverse direction according to a predefined maximum angle of rotation.

10. The plug connector according to claim 1, wherein the guide is a guide selected from the group consisting of a trapezoidal guide, a dovetail guide, and a guide with a tongue and groove.

11. The plug connector according to claim 1, wherein an inner dimension of the guide and an outer dimension of the at least one insulating element are selected such that the at least one insulating element can move a predefined distance orthogonally to the longitudinal direction and orthogonally to the transverse direction.

12. The plug connector according to claim 1, wherein the rail consists of aluminum and has a profile extruded or milled in the longitudinal direction.

13. The plug connector according to claim 1, wherein the at least one insulating element tapers conically in the transverse direction toward a free end of the at least one insulating element.

14. The plug connector according to claim 1, wherein the connector contact comprises at least one electric pin or receptacle connector contact extending in the transverse direction and configured to electrically connect to the electric connection of the fuel injector, wherein the at least one electric pin or receptacle connector contact is mounted in a pressure-tight and/or oil-tight manner in the at least one insulating element.

15. The plug connector according to claim 1, further comprising a seal extending radially around the at least one insulating element and protruding out of the rail in the transverse direction, wherein the seal comprises silicone and is configured to seal between the at least one insulating element and a corresponding feedthrough of a motor or valve cover in a pressure-tight and oil-tight manner, wherein the seal is arranged on a side of the at least one insulating element facing away from the rail.

16. The plug connector according to claim 1, further comprising a receptacle or pin connector contact extending in the transverse direction away from a free end of the at least one insulating element.

17. The plug connector according to claim 16, wherein the receptacle or pin connector contact includes a blind hole in a sheath of the receptacle or pin connector contact.

18. The plug connector according to claim 1, wherein the guide is configured to guide the at least one insulating element or the at least one holding element at two longitudinal outer edges, wherein the two longitudinal outer edges extend in the longitudinal direction on opposite outer surfaces of a base plate of the at least one insulating element or the at least one holding element.

19. The plug connector according to claim 1, further comprising a cable configured for connecting the plug connector arranged in the longitudinal direction between the rail and the at least one insulating element from a free end of the rail to the at least one insulating element.

20. A motor or valve cover element for an internal combustion engine, comprising a plug connector according to claim 1.

\* \* \* \* \*